(12) United States Patent
Osada

(10) Patent No.: US 12,416,843 B2
(45) Date of Patent: Sep. 16, 2025

(54) OPTICAL MODULE DRIVE DEVICE

(71) Applicant: ALPS ALPINE CO., LTD., Tokyo (JP)

(72) Inventor: Hiroshi Osada, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 551 days.

(21) Appl. No.: 17/809,664

(22) Filed: Jun. 29, 2022

(65) Prior Publication Data
US 2023/0004065 A1   Jan. 5, 2023

(30) Foreign Application Priority Data

Jul. 2, 2021   (JP) .................................. 2021-110979

(51) Int. Cl.
| | |
|---|---|
| *G03B 5/06* | (2021.01) |
| *G02B 27/64* | (2006.01) |
| *G03B 30/00* | (2021.01) |

(52) U.S. Cl.
CPC ............. *G03B 5/06* (2013.01); *G02B 27/646* (2013.01); *G03B 30/00* (2021.01); *G03B 2205/0023* (2013.01); *G03B 2205/0076* (2013.01)

(58) Field of Classification Search
None
See application file for complete search history.

(56) References Cited

U.S. PATENT DOCUMENTS

| | | | |
|---|---|---|---|
| 2013/0002933 A1 | 1/2013 | Topliss et al. | |
| 2013/0222685 A1* | 8/2013 | Topliss | G02B 27/646 |
| | | | 348/373 |
| 2014/0055630 A1* | 2/2014 | Gregory | F03G 7/065 |
| | | | 348/208.2 |
| 2017/0285443 A1* | 10/2017 | Hu | G02B 7/105 |
| 2018/0321505 A1 | 11/2018 | Minamisawa | |

(Continued)

FOREIGN PATENT DOCUMENTS

| | | | | |
|---|---|---|---|---|
| GB | 2588965 A | * 5/2021 | ............ | F03G 7/065 |
| GB | 2588965 | 11/2022 | | |

(Continued)

OTHER PUBLICATIONS

Japanese Office Action for 2021-110979 mailed on Oct. 1, 2024.

*Primary Examiner* — Derek S. Chapel
(74) *Attorney, Agent, or Firm* — IPUSA, PLLC

(57) ABSTRACT

The present invention controls against size increase of an optical module drive device. An optical module drive device has: a first swing member configured to hold an optical module; a second swing member connected to the first swing member such that the first swing member is swingable about a first swing axis that intersects the optical axis direction; a fixed member connected to the second swing member such that the second swing member is swingable about a second swing axis that intersects the optical axis direction and is perpendicular to the axial direction of the first swing axis; and a drive part configured to make the first swing member swing relative to the fixed member such that the optical axis tilts. The drive part includes a plurality of shape memory alloy wires provided between movable members including the first swing member and the second swing member, and the fixed member.

15 Claims, 18 Drawing Sheets

(56) References Cited

U.S. PATENT DOCUMENTS

| | | | | |
|---|---|---|---|---|
| 2025/0068034 A1* | 2/2025 | Yokota | ................... | G02B 7/04 |
| 2025/0076733 A1* | 3/2025 | Yokota | ................. | H04N 23/40 |

FOREIGN PATENT DOCUMENTS

| | | |
|---|---|---|
| JP | 2011-066580 | 3/2011 |
| JP | 2013-520701 | 6/2013 |
| JP | 2018-189816 | 11/2018 |
| WO | WO-2021066272 A1 * | 4/2021 |

* cited by examiner

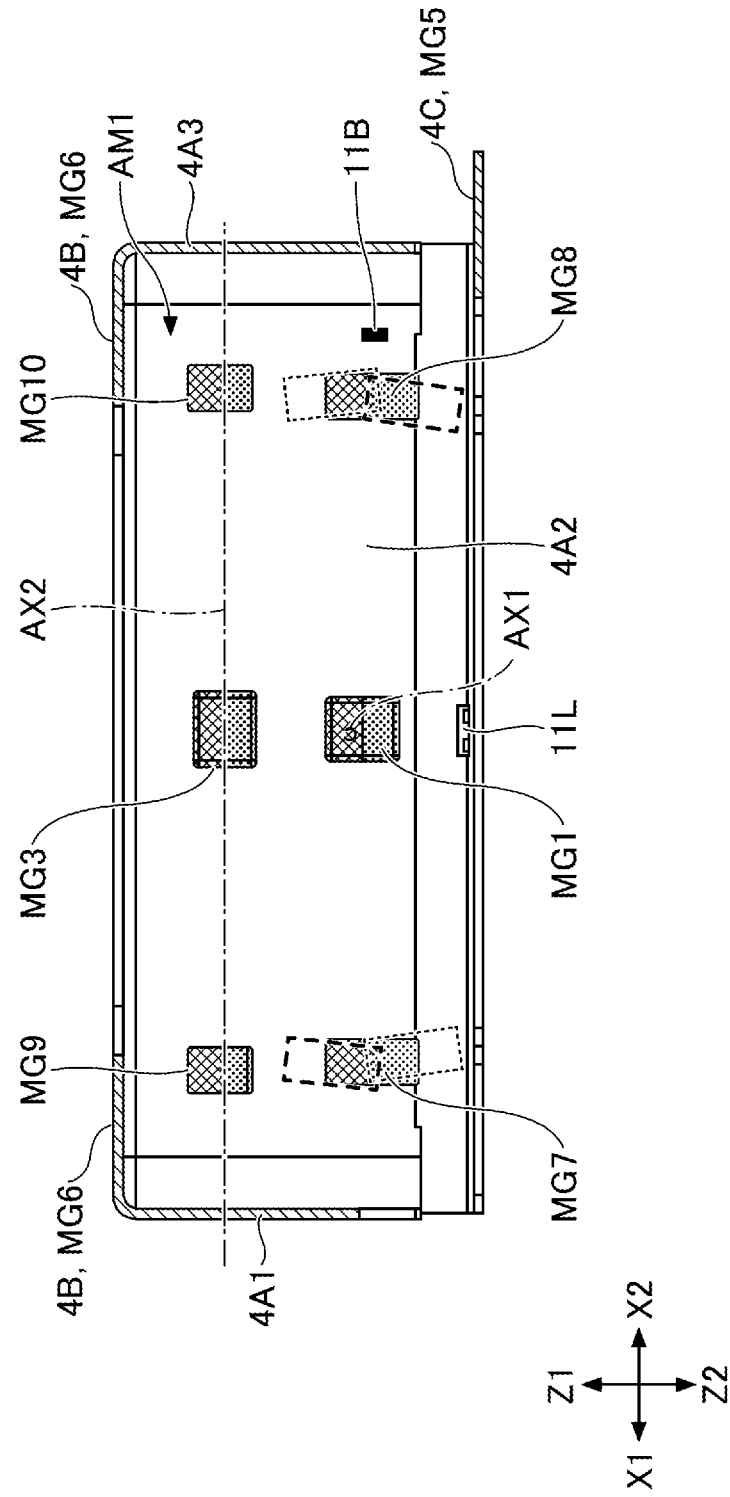

OPTICAL MODULE DRIVE DEVICE

CROSS-REFERENCE TO RELATED APPLICATION

The present application is based on and claims priority to Japanese Patent Application No. 2021-110979, field on Jul. 2, 2021, the entire content of which are incorporated herein by reference.

BACKGROUND OF THE INVENTION

1. Field of the Invention

The present disclosure relates to an optical module drive device.

2. Description of the Related Art

Conventionally, there is a camera unit (see patent document 1) that is known for having: an optical module including a lens and an image pickup element; and a camera shake correction device (an optical module drive device) for correcting the shake of an optical image formed on the image pickup element by the lens. This optical module drive devices has: an inner frame for internally fixing the optical module; an intermediate frame for supporting the inner frame from outside such that the inner frame freely rocks about a first axis; an outer frame for supporting the intermediate frame from outside such that the intermediate frame freely rocks about a second axis; and voice coil motors provided in the bottom part of the inner frame and the bottom part of the outer frame.

CITATION LIST

Patent Document

[Patent Document 1] Japanese Unexamined Patent Application Publication No. 2011-66580

SUMMARY OF THE INVENTION

Technical Problem

The above-described optical module drive device adopts a voice coil motor system and therefore requires magnets and coils, but this in turn entails the risk of making the device bigger.

Therefore, an art to prevent an optical module drive device from increasing in size is in demand.

Solution to Problem

An optical module drive device, according to one embodiment of the present invention, includes: a first swing member configured to hold an optical module including a lens body and an image sensor; a second swing member connected to the first swing member such that the first swing member is swingable about a first axial line that intersects an optical axis direction; a fixed member connected to the second swing member such that the second swing member is swingable about a second axial line that intersects the optical axis direction and is perpendicular to an axial direction of the first axial line; and a drive part configured to make the first swing member swing relative to the fixed member such that an optical axis of the lens body tilts. In this optical module drive device, the drive part includes a plurality of shape memory alloy wires provided between movable members including the first swing member and the second swing member, and the fixed member.

Advantageous Effects of the Invention

The above-described optical module drive device can prevent the optical module drive device from increasing in size.

BRIEF DESCRIPTION OF THE DRAWINGS

FIG. 12A is a cross-sectional view of cover members and magnetic members; and

DETAILED DESCRIPTION OF THE PREFERRED EMBODIMENTS

Figure 1A:
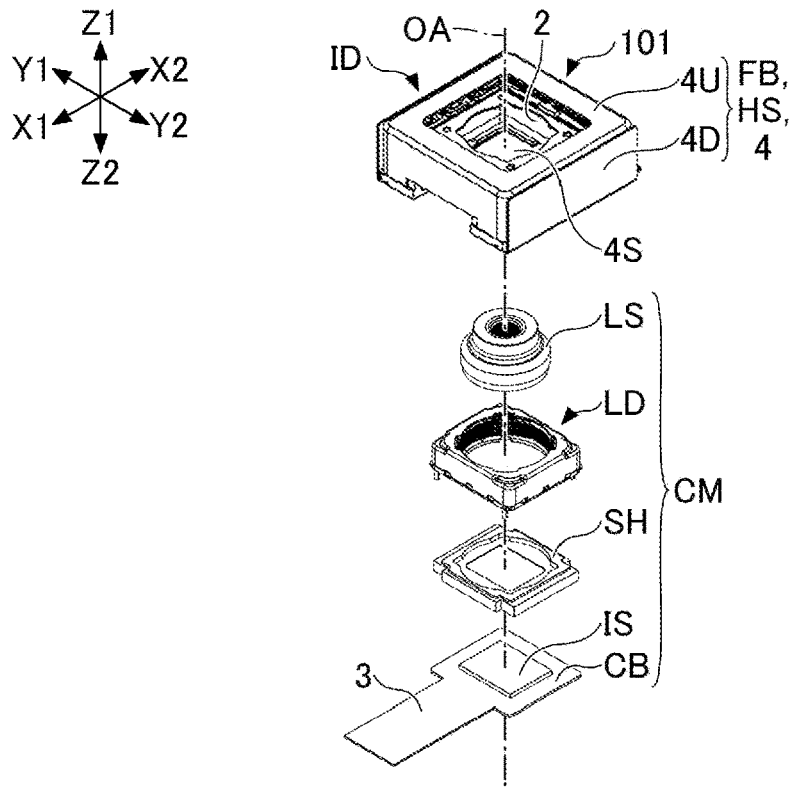
FIG. 1A is a perspective view of an imaging device as disassembled.
Figure 1B:
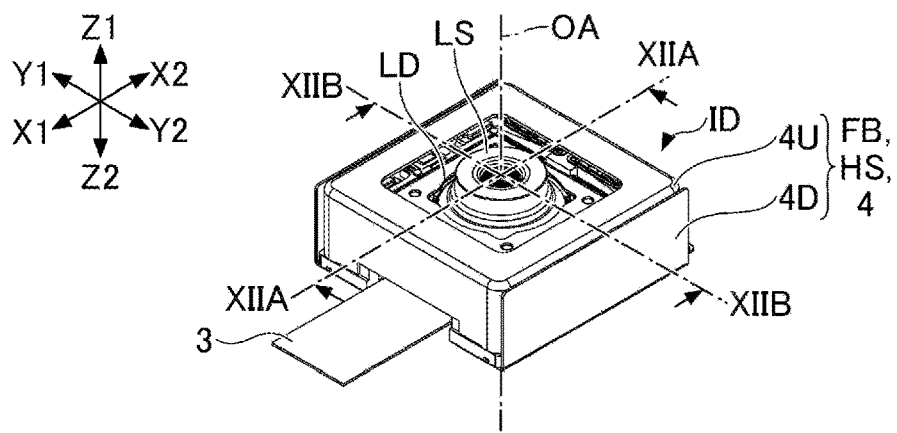
FIG. 1B is a perspective view of the imaging device as assembled.
Figure 2:
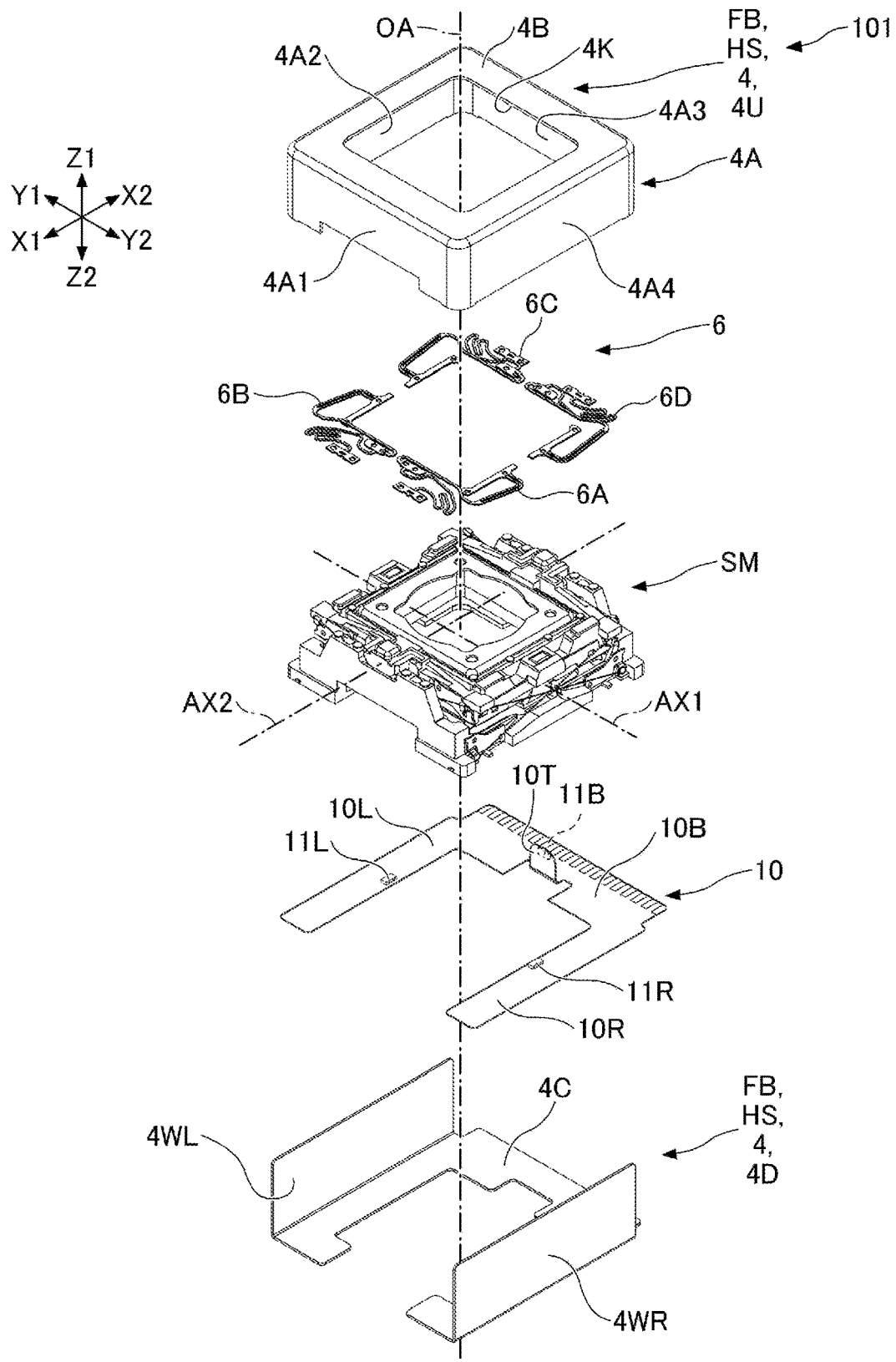
FIG. 2 is a perspective view of an optical module drive device as disassembled.
Figure 3:
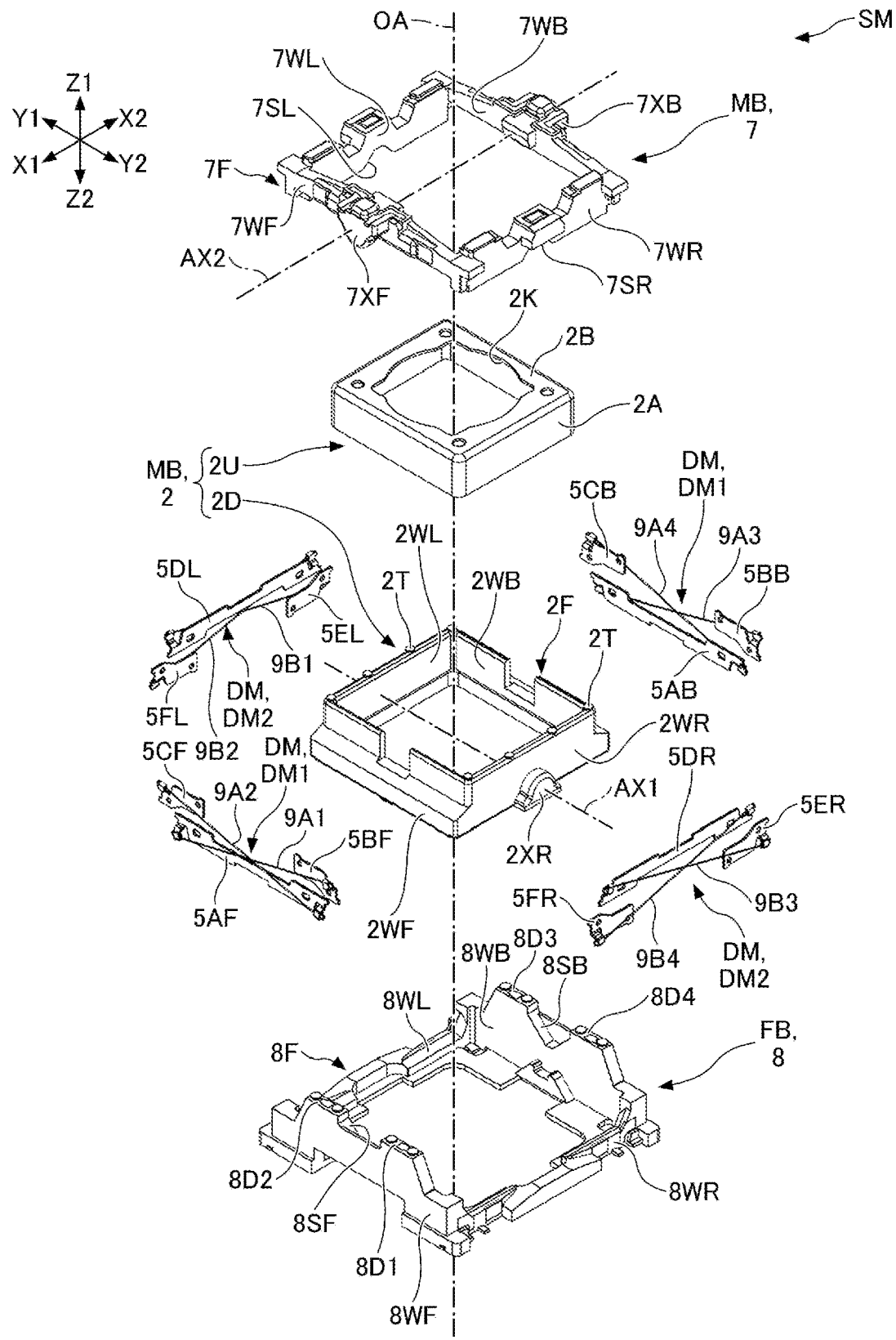
FIG. 3 is a perspective view of a swing mechanism as disassembled.

Hereinafter, an imaging device ID, which includes an optical module drive device 101 according to an embodiment of the present invention, will be described with reference to the accompanying drawings. FIG. 1A is a perspective view of the imaging device ID as disassembled in a state in which a camera module CM is removed from the optical module drive device 101. FIG. 1B is a perspective view of the imaging device ID as assembled in a state in which the camera module CM is attached to the optical module drive device 101. FIG. 2 is a perspective view of the optical module drive device 101 as disassembled. FIG. 3 is a perspective view of a swing mechanism SM as disassembled, where the swing mechanism SM constitutes the optical module drive device 101.

In FIG. 1A, X1 represents one direction on an X axis that constitutes a three-dimensional orthogonal coordinate system and X2 represents the other direction on the X axis. Also, Y1 represents one direction on a Y axis that constitutes the three-dimensional orthogonal coordinate system, and Y2 represents the other direction on the Y axis. Similarly, Z1 represents one direction on a Z axis that constitutes the three-dimensional orthogonal coordinate system, and Z2 represents the other direction on the Z axis. In FIG. 1A, the X1 side of the imaging device ID corresponds to the front side (the front surface side) of the imaging device ID, and the X2 side of the imaging device ID corresponds to the rear side (the rear surface side) of the imaging device ID. Also, the Y1 side of the imaging device ID corresponds to the left side of the imaging device ID, and the Y2 side of the imaging device ID corresponds to the right side of the imaging device ID. Also, the Z1 side of the imaging device ID corresponds to the upper side (the side facing the object to capture an image of) of the imaging device ID, and the Z2 side of the imaging device ID corresponds to the lower side (the side facing the image sensor) of the imaging device ID. The same applies to the other figures, devices, members, mechanisms, and so forth.

As illustrated in FIG. 1A, FIG. 1B, and FIG. 2, the optical module drive device 101 includes cover members 4 that are a part of a fixed member FB. The cover members 4 include an upper cover member 4U and a lower cover member 4D.

The cover members 4 are configured to function as a housing HS that covers the other members that constitute the imaging device ID. In this embodiment, the upper cover member 4U and the lower cover member 4D are made of magnetic material such as magnetic metal. Also, the cover members 4 have a box-like outer shape with a storage part 4S defined therein, as illustrated in FIG. 1A. As illustrated in FIG. 1B, the camera module CM is accommodated in the storage part 4S. The camera module CM is an example optical module.

As illustrated in FIG. 1A, the camera module CM is constituted by a circuit board CB, a sensor holder SH, a lens drive device LD, a lens body LS held by the lens drive device LD, and an image sensor IS mounted on the circuit board CB so as to face the lens body LS. The lens body LS is, for example, a cylindrical lens barrel with at least one lens, and configured such that its central axial line runs along an optical axis OA. The sensor holder SH is provided with a partition in which an opening for exposing the image sensor IS formed. Furthermore, the image sensor IS accommodated on the lower side (the Z2 side) of the partition, and an IR cut filter (not shown) is arranged on the upper side (the Z1 side) of the partition. The camera module CM according to this embodiment is a camera module with a voice coil motor-based automatic focus adjustment function, and includes magnets and coils. The camera module CM may employ other systems of drive mechanism than voice coil motor system, such as piezoelectric system, shape memory actuator system, and so forth. The circuit board CB is connected to the outside via a flexible cable 3.

Referring now to FIG. 2, the upper cover member 4U includes peripheral wall parts 4A, which are provided in a substantially rectangular cylindrical shape, and a flat upper plate part 4B, which is provided so as to be contiguous with the upper ends (the ends on the Z1 side) of the peripheral wall parts 4A. The peripheral wall parts 4A include a first side plate part 4A1 to a fourth side plate part 4A4. The first side plate part 4A1 and the third side plate part 4A3 face each other, and the second side plate part 4A2 and the fourth side plate part 4A4 face each other. Furthermore, the first side plate part 4A1 and the third side plate part 4A3 extend perpendicularly to the second side plate part 4A2 and the fourth side plate part 4A4. The upper plate part 4B has an opening 4K in the center, as illustrated in FIG. 2.

As illustrated in FIG. 2, the lower cover member 4D includes a frame-shaped (C-shaped) bottom part 4C with a notched front portion, a left wall part 4WL provided so as to be contiguous with the left end of the bottom part 4C, and a right wall part 4WR provided so as to be contiguous with the right end of the bottom part 4C. The left wall part 4WL is configured such that its inner surface (the surface on the Y2 side) faces the outer surface (the surface on the Y1 side) of the second side plate part 4A2 of the upper cover member 4U. The right wall part 4WR is configured such that its inner surface (the surface on the Y1 side) faces the outer surface (the surface on the Y2 side) of the fourth side plate part 4A4 of the upper cover member 4U.

The upper cover member 4U and the lower cover member 4D are joined to a base member 8 with an adhesive (see FIG. 3). The adhesive is, for example, a photocurable adhesive. The photocurable adhesive is, for example, an ultraviolet curable adhesive, a visible light curable adhesive, or the like. The adhesive may be a moisture curable adhesive or a thermosetting adhesive. The same applies to the adhesives described later herein. Furthermore, as illustrated in FIG. 2, leaf springs 6, a swing mechanism SM, an insulating circuit board 10, and the like are accommodated in the cover member 4 that serves as the housing HS.

The swing mechanism SM is configured to allow the camera module CM to swing about swing axes. Note that, as illustrated in FIG. 2, the swing axes here refer to a first swing axis AX1 and a second swing axis AX2. These axes are orthogonal to each other in top view presented in an optical axis direction. In the following description, the first swing axis AX1 and the second swing axis AX2 may be referred to simply as swing axes AX for ease of explanation. The optical axis direction refers to the direction of the optical axis OA with respect to the lens body LS, and directions that are parallel to the optical axis OA.

To be more specific, as illustrated in FIG. 3, the swing mechanism SM is constituted by a movable member MB, metal members, base member 8, shape memory alloy wires, and the like.

The metal members include a first front metal member 5AF, a first rear metal member 5AB, a second front metal member 5BF, a second rear metal member 5BB, a third front metal member 5CF, a third rear metal member 5CB, a fourth left metal member 5DL, a fourth right metal member 5DR, a fifth left metal member 5EL, a fifth right metal member 5ER, a sixth left metal member 5FL, and a sixth right metal member 5FR.

The first front metal member 5AF and the first rear metal member 5AB may be referred to simply as first metal members 5A for ease of explanation. The second front metal member 5BF and the second rear metal member 5BB may be referred to simply as second metal members 5B for ease of explanation. The third front metal member 5CF and the third rear metal member 5CB may be referred to simply as third metal members 5C for ease of explanation. The fourth left metal member 5DL and the fourth right metal member 5DR may be referred to simply as fourth metal members 5D for ease of explanation. The fifth left metal member 5EL and the fifth right metal member 5ER may be referred to simply as fifth metal members 5E for ease of explanation. The sixth left metal member 5FL and the sixth right metal member 5FR may be referred to simply as sixth metal members 5F for ease of explanation. Furthermore, the first metal member 5A to the sixth metal member 5F may be referred to simply as metal members 5 for ease of explanation.

The shape memory alloy wires extend along the inner surfaces of the peripheral wall parts 4A of the upper cover member 4U, and configured such that the movable member MB can be swung relative to the fixed member FB. In this embodiment, the shape memory alloy wires include a first inner wire 9A1 to a fourth inner wire 9A4 and a first outer wire 9B1 to a fourth outer wire 9B4. These shape memory alloy wires are configured such that a first swing member 2 and a second swing member 7, which serve as the movable member MB, can be swung relative to the base member 8, which serves as the fixed member FB. The first inner wire 9A1 to the fourth inner wire 9A4 may be referred to simply as first shape memory alloy wires 9A for ease of explanation. The first outer wire 9B1 to the fourth outer wire 9B4 may be referred to simply as second shape memory alloy wires 9B for ease of explanation. Furthermore, the first shape memory alloy wires 9A and the second shape memory alloy wires 9B may be referred to simply as shape memory alloy wires 9 for ease of explanation.

The movable members MB include the first swing member 2 and the second swing member 7. The first swing member 2 is configured such that the camera module CM that constitutes the optical module can be held. In this embodiment, to allow movement in which the optical axis OA with respect to the lens body LS tilts, the first swing member 2 is configured to swing about the first swing axis AX1 relative to the second swing member 7, and the second swing member 7 is configured to swing about the second swing axis AX2 relative to the base member 8.

The movable member MB is moved by drive parts DM such that the optical axis OA tilts. The drive parts DM are configured such that the first swing member 2 can be swung relative to the fixed member FB such that the optical axis OA of the lens body tilts. In this embodiment, the drive parts DM include a first drive part DM1 that makes the first swing member 2 swing relative to the second swing member 7, and a second drive part DM2 that makes the second swing member 7 swing relative to the base member 8. The drive parts DM are constituted by shape memory alloy wires 9. To be more specific, the shape memory alloy wires 9 include first shape memory alloy wires 9A provided between the first swing member 2 and the second swing member 7, and second shape memory alloy wires 9B provided between the second swing member 7 and the fixed member FB (the base member 8). The first drive part DM1 is constituted by the first shape memory alloy wires 9A, and the second drive part DM2 is constituted by the second shape memory alloy wires 9B. The first swing member 2 is moved by the first shape memory alloy wires 9A such that the first swing member 2 is swingable about the first swing axis AX1 relative to the second swing member 7. The second swing member 7 is moved by the second shape memory alloy wires 9B such that the second swing member 7 is swingable about the second swing axis AX2 relative to the base member 8.

The first swing member 2 has an upper holder 2U and a lower holder 2D. In this embodiment, the upper holder 2U is made of magnetic metal so as to function as a magnetic shield. This is to reduce the magnetic interference between the components of the camera module CM and the components of the optical module drive device 101. However, the upper holder 2U may be made of non-magnetic metal, synthetic resin, or the like.

To be more specific, as illustrated in FIG. 3, the upper holder 2U has a peripheral wall part 2A of a substantially rectangular cylindrical shape, and an upper plate part 2B of a flat shape. The upper plate part 2B is provided so as to be contiguous with the upper end (the end on the Z1 side) of the peripheral wall part 2A. The upper plate part 2B has an opening 2K in the center.

The lower holder 2D is formed by injection-molding a synthetic resin such as a liquid crystal polymer (LCP). Referring to the example illustrated in FIG. 3, the lower holder 2D includes a frame-like part 2F and a pair of axis parts (a left axis part 2XL (not illustrated in FIG. 3, and see FIG. 5B) and a right axis part 2XR). The frame-like part 2F is formed in a substantially rectangular cylindrical shape and extends along the optical axis OA. The pair of axis parts protrude outward along the first swing axis AX1 from the frame-like part 2F. In the following description, the left axis part 2XL and the right axis part 2XR may be referred to simply as a pair of axis parts 2X for ease of explanation.

Among the four wall parts (namely a rear wall part 2WB, a front wall part 2WF, a left wall part 2WL, and a right wall part 2WR) constituting the frame-like part 2F having a substantially rectangular outer shape in top view, two opposing wall parts (the left wall part 2WL and the right wall part 2WR) each have four round upward-protruding protruding parts 2T formed on the upper end. Furthermore, part of the leaf springs 6 is placed on the upper end of each of these two wall parts (the left wall part 2WL and the right wall part 2WR).

The pair of axis parts 2X are parts that constitute the first swing axis AX1, and include a left axis part 2XL (not illustrated in FIG. 3, and see FIG. 5B) formed on the outside of the left wall part 2WL of the frame-like part 2F, and a right axis part 2XR formed on the outside of the right wall part 2WR of the frame-like part 2F. To be more specific, the left axis part 2XL and the right axis part 2XR both have a semi-cylindrical outer shape that is projecting upward. Furthermore, the pair of axis parts 2X are configured to be received by a pair of receiving parts (a left receiving part 7SL and a right receiving part 7SR) provided in the second swing member 7. In the following description, the left receiving part 7SL and the right receiving part 7SR may be referred to simply as a pair of receiving parts 7S for ease of explanation.

The upper holder 2U and the lower holder 2D are configured to accommodate at least a part of the camera module CM. Also, the lower holder 2D is fixed to the upper holder 2U with an adhesive. The peripheral wall part 2A of the upper holder 2U is arranged inside the frame-like part 2F of the lower holder 2D.

The second swing member 7 is formed by injection-molding a synthetic resin such as a liquid crystal polymer (LCP). In the example illustrated in FIG. 3, the second swing member 7 has a frame-like part 7F having a substantially rectangular frame shape. Among the four wall parts (namely, a rear wall part 7WB, a front wall part 7WF, a left wall part 7WL, and a right wall part 7WR) constituting this frame-like part 7F, two opposing wall parts (the left wall part 7WL and the right wall part 7WR) have a pair of receiving parts 7S formed in the center part of the lower end. Also, in the other two opposing wall parts (the rear wall part 7WB and the front wall part 7WF) among these four wall parts constituting the frame-like part 7F, a pair of axis parts (a front axis part 7XF and a rear axis part 7XB) are formed on the outside. In the following description, the front axis part 7XF and the rear axis part 7XB may be referred to simply as a pair of axis parts 7X for ease of explanation.

In this embodiment, the pair of receiving parts 7S have a substantially V-groove shape that is recessed upward, so as to receive the pair of axis parts 2X having a semi-cylindrical outer shape that is projecting upward. To be more specific, the pair of receiving parts 7S include a left receiving part 7SL formed in the lower-end center part of the left wall part 7WL of the frame-like part 7F, and a right receiving part 7SR formed in the lower-end center part of the right wall part 7WR of the frame-like part 7F.

The pair of axis parts 7X are parts that constitute the second swing axis AX2, and include a front axis part 7XF formed on the outside of the front wall part 7WF of the frame-like part 7F, and a rear axis part 7XB formed on the outside of the rear wall part 7WB of the frame-like part 7F. To be more specific, the front axis part 7XF and the rear axis part 7XB both have a semi-cylindrical outer shape that is projecting downward. Furthermore, the pair of axis parts 7X are configured such that these axis parts are received by a pair of receiving parts (a front receiving part 8SF and a rear receiving part 8SB) provided in the base member 8. In the following description, the front receiving part 8SF and the rear receiving part 8SB may be referred to simply as a pair of receiving parts 8S for ease of explanation.

The base member 8 is formed by injection-molding a synthetic resin such as a liquid crystal polymer (LCP). In the example illustrated in FIG. 3, the base member 8 has a frame-like part 8F having a substantially rectangular frame shape. Among the four wall parts (a rear wall part 8WB, a front wall part 8WF, a left wall part 8WL, and a right wall part 8WR) constituting the frame-like part 8F, two opposing wall parts (the rear wall part 8WB and the front wall part 8WF) have a pair of receiving parts 8S formed in the center part at the upper end. In this embodiment, the pair of receiving parts 8S have a substantially V-groove shape that is recessed downward so as to receive the pair of axis parts 7X having a semi-cylindrical outer shape that is projecting downward. To be more specific, the pair of receiving parts 8S include a front receiving part 8SF formed in the upper-end center part of the front wall part 8WF of the frame-like part 8F, and a rear receiving part 8SB formed in the upper-end center part of the rear wall part 8WB of the frame-like part 8F.

Pedestal parts are formed at the upper end of both the front wall part 8WF and the rear wall part 8WB of the frame-like part 8F. In the example illustrated in FIG. 3, the pedestal parts include a first pedestal part 8D1 to a fourth pedestal part 8D4. The first pedestal part 8D1 and the second pedestal part 8D2 are formed at the upper end of the front wall part 8WF so as to sandwich the front receiving part 8SF. The third pedestal part 8D3 and the fourth pedestal part 8D4 are formed at the upper end of the rear wall part 8WB so as to sandwich the rear receiving part 8SB. In the following description, the first pedestal part 8D1 to the fourth pedestal part 8D4 may be referred to simply as pedestal parts 8D for ease of explanation.

The shape memory alloy wires 9, which are an example of a shape memory actuator, constitute the drive parts DM. In this embodiment, the shape memory alloy wires 9 include the first shape memory alloy wires 9A and the second shape memory alloy wires 9B. The first shape memory alloy wires 9A include a first inner wire 9A1 to a fourth inner wire 9A4. The second shape memory alloy wires 9B include a first outer wire 9B1 to a fourth outer wire 9B4. The temperature of the shape memory alloy wires 9 rises when an electric current flows, and the shape memory alloy wires 9 contract in response to that rise of temperature. The drive parts DM can make the movable member MB swing about the swing axes AX by making use of the contraction of the shape memory alloy wires 9. To be more specific, a drive part DM (the first drive part DM1) can make use of the contraction of the first shape memory alloy wires 9A to make the first swing member 2 swing about the first swing axis AX1 relative to the second swing member 7. Also, a drive part DM (the second drive part DM2) can make use of the contraction of the second shape memory alloy wires 9B to make the second swing member 7 swing about the second swing axis AX2 relative to the base member 8.

In the example illustrated in FIG. 3, the shape memory alloy wires 9 are configured such that, when one or more of the first inner wire 9A1 to the fourth inner wire 9A4 and the first outer wire 9B1 to the fourth outer wire 9B4 contract, the movable member MB swings, and, by this swing, another one or more of the above inner and outer wires are stretched. To be more specific, by making the first inner wire 9A1 and the second inner wire 9A2 contract at the same time, the drive parts DM can make the first swing member 2 swing clockwise with respect to the first swing axis AX1 in right side view, relative to the second swing member 7. Also, by making the third inner wire 9A3 and the fourth inner wire 9A4 contract at the same time, the drive parts DM can make the first swing member 2 swing counterclockwise with respect to the first swing axis AX1 in right side view, relative to the second swing member 7. Also, by making the first outer wire 9B1 and the second outer wire 9B2 contract at the same time, the drive parts DM can make the first swing member 2 and the second swing member 7 swing counterclockwise with respect to the second swing axis AX2 in front view, relative to the base member 8. Also, by making the third outer wire 9B3 and the fourth outer wire 9B4 contract at the same time, the drive parts DM can make the first swing member 2 and the second wing member 7 swing clockwise with respect to the second swing axis AX2 in front view, relative to the base member 8.

Thus, the drive parts DM include a plurality of first shape memory alloy wires 9A provided between the first swing member 2 and the second swing member 7, and a plurality of second shape memory alloy wires 9B provided between the second swing member 7 and the fixed member FB (the base member 8).

Furthermore, the first shape memory alloy wires 9A are arranged at two locations that are spaced apart in the axial direction of the second swing axis AX2, with the first swing member 2 placed in between. The second shape memory alloy wires 9B are arranged at two locations that are spaced apart in the axial direction of the first swing axis AX1 with the first swing member 2 placed in between.

Two first shape memory alloy wires 9A are arranged at both of the two locations spaced apart in the axial direction of the second swing axis AX2. These two pairs of first shape memory alloy wires 9A each intersect each other when viewed in the axial direction of the second swing axis AX2, and form a first wire pair.

In the example illustrated in FIG. 3, the first inner wire 9A1 and the second inner wire 9A2 are arranged at a location in front of the first swing member 2, and the first inner wire 9A1 and the second inner wire 9A2 intersect each other in front view and form a first front wire pair. Also, the third inner wire 9A3 and the fourth inner wire 9A4 are arranged at a location behind the first swing member 2, and the third inner wire 9A3 and the fourth inner wire 9A4 intersect each other in rear view and form a first rear wire pair.

Two second shape memory alloy wires 9B are arranged at both of the two locations spaced apart in the axial direction of the first swing axis AX1. These two pairs of second shape memory alloy wires 9B each intersect each other when viewed in the axial direction of the first swing axis AX1, and form a second wire pair.

In the example illustrated in FIG. 3, the first outer wire 9B1 and the second outer wire 9B2 are arranged at a location to the left of the first swing member 2. The first outer wire 9B1 and the second outer wire 9B2 intersect each other in left side view, and form a second left wire pair. Also, the third outer wire 9B3 and the fourth outer wire 9B4 are arranged at a location to the right of the first swing member 2. The third outer wire 9B3 and the fourth outer wire 9B4 intersect each other in right side view, and form a second right wire pair.

In this embodiment, the shape memory alloy wires 9 are fixed to the movable member MB and the fixed member FB via the metal members 5. The metal members 5 are configured to fix the end parts of the shape memory alloy wires 9.

In the example illustrated in FIG. 3, one end (the lower end) of each of the first inner wire 9A1 and the second inner wire 9A2 is connected to the first front metal member 5AF. That is, the first inner wire 9A1 and the second inner wires 9A are connected in series via the first front metal member 5AF. Similarly, one end (the lower end) of each of the third inner wire 9A3 and the fourth inner wire 9A4 is connected to the first rear metal member 5AB. That is, the third inner wire 9A3 and the fourth inner wire 9A4 are connected in series via the first rear metal member 5AB.

The other end (the upper end) of the first inner wire 9A1 is connected to the second front metal member 5BF, and The other end (the upper end) of the third inner wire 9A3 is connected to the second rear metal member 5BB. The other end (the upper end) of the second inner wire 9A2 is connected to the third front metal member 5CF, and The other end (the upper end) of the fourth inner wire 9A4 is connected to the third rear metal member 5CB.

One end (the upper end) of each of the first outer wire 9B1 and the second outer wire 9B2 is connected to the fourth left metal member 5DL. That is, the first outer wire 9B1 and the second outer wire 9B2 are connected in series via the fourth left metal member 5DL. Similarly, one end (the upper end) of each of the third outer wire 9B3 and the fourth outer wire 9B4 is connected to the fourth right metal member 5DR. That is, the third outer wire 9B3 and the fourth outer wire 9B4 are connected in series via the fourth right metal member 5DR.

The other end (the lower end) of the first outer wire 9B1 is connected to the fifth left metal member 5EL, and the other end (the lower end) of the third outer wire 9B3 is connected to the fifth right metal member 5ER. The other end (the lower end) of the second outer wire 9B2 is connected to the sixth left metal member 5FL, and the other end (the lower end) of the fourth outer wire 9B4 is connected to the sixth right metal member 5FR.

The insulating circuit board 10 is a member for connecting the drive parts DM with a control device (not shown). The control device is configured to supply electric current to the drive parts DM. Typically, the control device is located outside the housing HS. In this embodiment, the insulating circuit board 10 is a flexible printed circuit board, and includes, as illustrated in FIG. 2, a rear part 10B, a left part 10L, and a right part 10R. The rear part 10B includes a tongue part 10T that is bent at the front end of the center part of the rear part 10B and extends upward.

Magnetic sensors are attached to the insulating circuit board 10. These magnetic sensors are configured to detect the position of the movable member MB by detecting the positions of magnets attached to the movable member MB as magnetic members. In this embodiment, the magnetic sensors include a rear magnetic sensor 11B, a left magnetic sensor 11L, and a right magnetic sensor 11R. The rear magnetic sensor 11B, the left magnetic sensor 11L, and the right magnetic sensor 11R may be referred to simply as magnetic sensors 11 for ease of explanation.

As illustrated in FIG. 2, the rear magnetic sensor 11B is attached to the tongue part 10T of the insulating circuit board 10, the left magnetic sensor 11L is attached to the left part 10L of the insulating circuit board 10, and the right magnetic sensor 11R is attached to the right part 10R of the insulating circuit board 10.

In this embodiment, the magnetic sensors 11 are configured to detect the position of the movable member MB by using analog output-type Hall elements. However, the magnetic sensors 11 may also be configured to detect the position of the movable member MB by using magneto resistive elements that can detect the magnetic fields generated by magnets provided as magnetic members. These magneto resistive elements include a giant magneto resistive effect (GMR) element, a semiconductor magneto resistive (SMR) element, an anisotropic magneto resistive (AMR) element, a tunnel magneto resistive (TMR) element, and so forth.

Figure 4A:
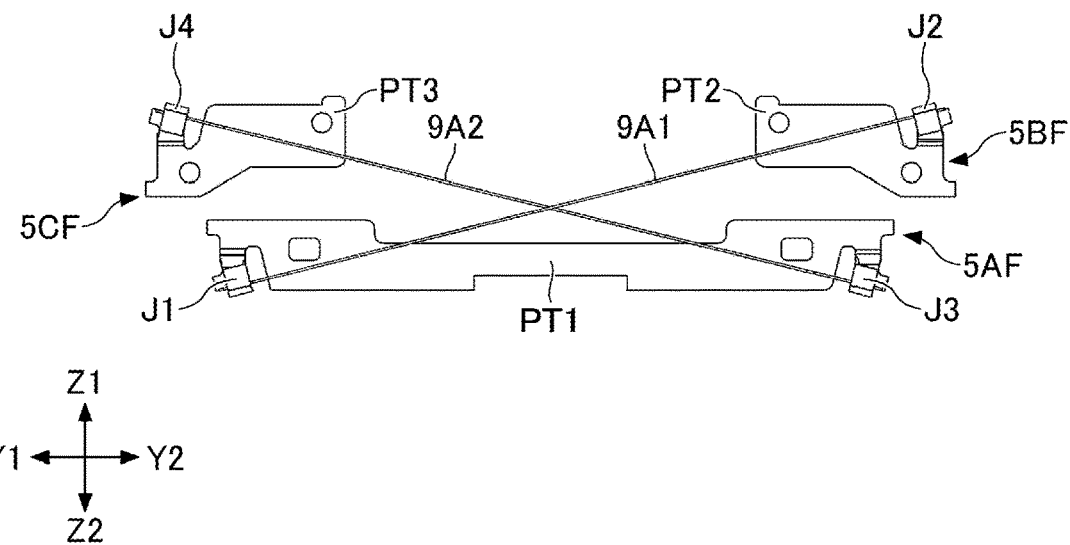
FIG. 4A is a front view of shape memory alloy wires attached to metal members.
Figure 4B:
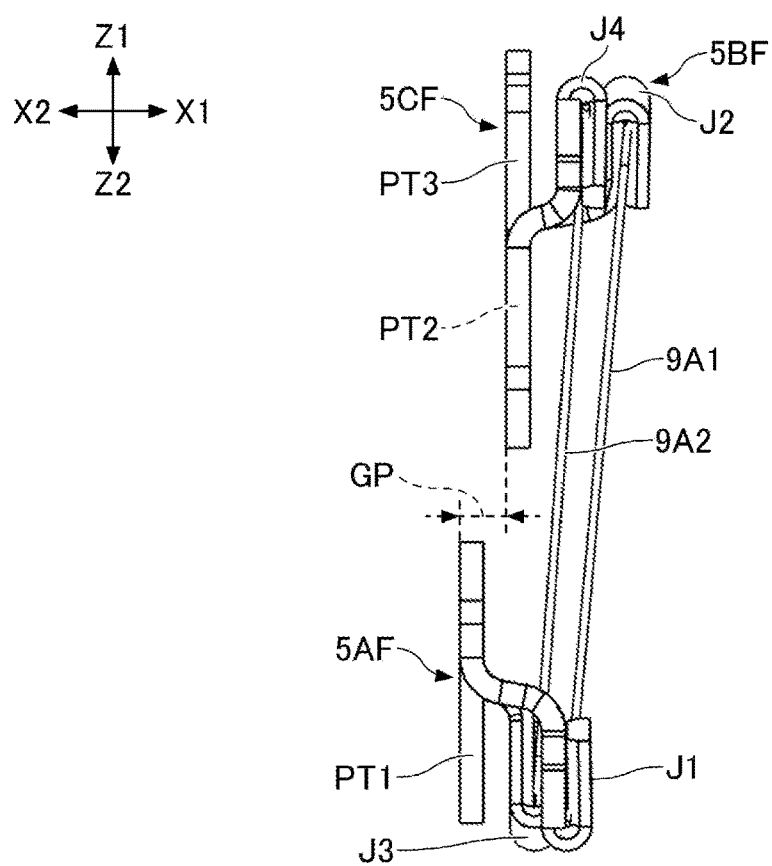
FIG. 4B is a left side view of the shape memory alloy wires attached to metal members.

Now, with reference to FIG. 4A and FIG. 4B, the metal members 5, to which the shape memory alloy wires 9 are attached, will be described. FIG. 4A is a front view of shape memory alloy wires 9 attached to metal members 5. To be more specific, FIG. 4A illustrates a state in which the first inner wire 9A1 attached to the first front metal member 5AF and the second front metal member 5BF, and the second inner wire 9A2 attached to the first front metal member 5AF and the third front metal member 5CF are viewed from the X1 side (the front surface side). FIG. 4B is a left side view of shape memory alloy wires 9 attached to metal members 5. To be more specific, FIG. 4B illustrates a state in which the first inner wire 9A1 attached to the first front metal member 5AF and the second front metal member 5BF, and the second inner wire 9A2 attached to the first front metal member 5AF and the third front metal member 5CF are viewed from the Y1 side (the left side surface side). Note that the positional relationship of each member illustrated in FIG. 4A and FIG. 4B corresponds to the positional relationship of each member when the optical module drive device 101 is assembled. Furthermore, in FIG. 4A and FIG. 4B, illustration of other members is omitted for clarification. Also, the following description to make reference to FIG. 4A and FIG. 4B relates to the first front wire pair, which is the combination of the first inner wire 9A1 and the second inner wire 9A2, but also applies to the first rear wire pair, which is the combination of the third inner wire 9A3 and the fourth inner wire 9A4, the second left wire pair, which is the combination of the first outer wire 9B1 and the second outer wire 9B2, and the second right wire pair, which is the combination of the third outer wire 9B3 and the fourth outer wire 9B4.

To be more specific, one end (the lower end) of the first inner wire 9A1 is fixed to the first front metal member 5AF in a holding part J1 located in the left end part of the first front metal member 5AF. The other end (the upper end) of the first inner wire 9A1 is fixed to the second front metal member 5BF in a holding part J2 located in the right end part of the second front metal member 5BF. To be more specific, the first inner wire 9A1 is fixed to the first front metal member 5AF by crimping or welding. Similarly, one end (the lower end) of the second inner wire 9A2 is fixed to the first front metal member 5AF in a holding part J3 located in the right end part of the first front metal member 5AF, and the other end (the upper end) of the second inner wire 9A2 is fixed to the third front metal member 5CF in a holding part J4 located in a left end part of the third front metal member 5CF.

The holding part J1 is formed by bending a part of the first front metal member 5AF. To be more specific, a part of the first front metal member 5AF is bent to sandwich one end (the lower end) of the first inner wire 9A1, thereby forming the holding part J1. Furthermore, the one end (the lower end) of the first inner wire 9A1 is fixed to the holding part J1 by welding. The same applies to the holding part J2 to the holding part J4.

As illustrated in FIG. 4A and FIG. 4B, the first inner wire 9A1 and the second inner wire 9A2 are arranged so as to be twisted to each other. That is, the first inner wire 9A1 and the second inner wire 9A2 are arranged so as not to come into contact with each other (non-contact).

Figure 5A:
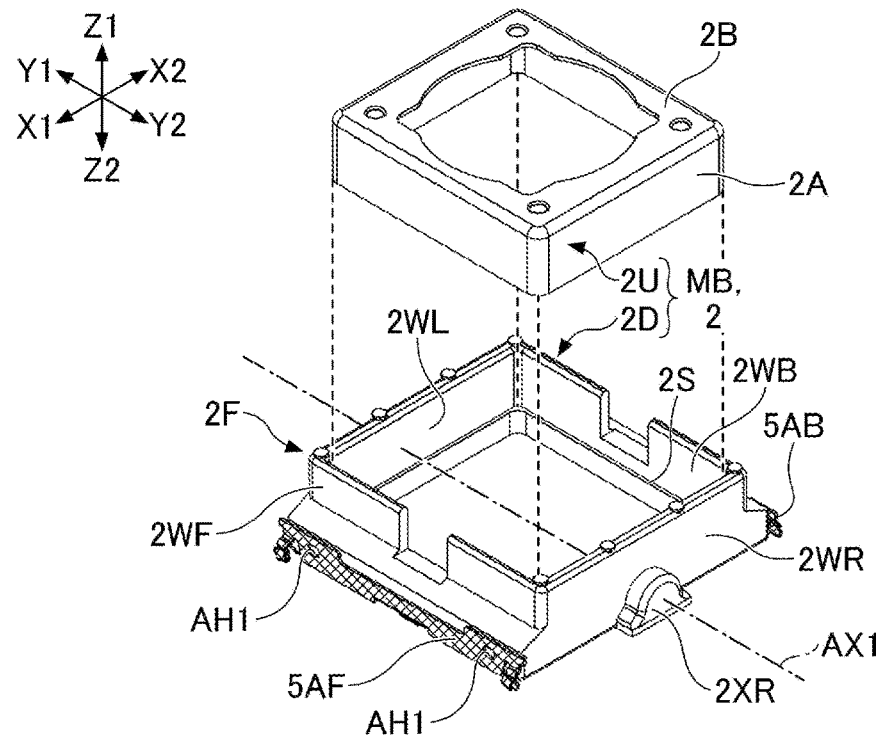
FIG. 5A is a top perspective view of a first swing member.
Figure 5B:
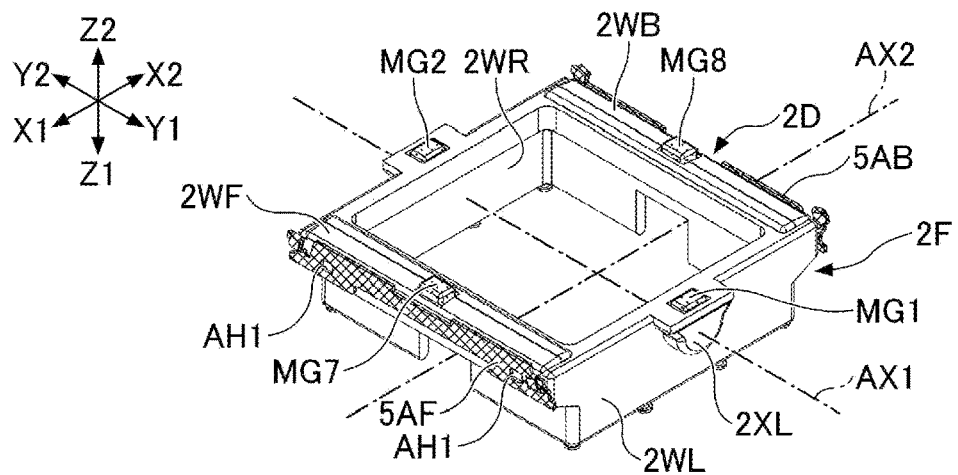
FIG. 5B is a bottom perspective view of the first swing member.

Next, an example configuration of the first swing member 2 will be described with reference to FIG. 5A and FIG. 5B. FIG. 5A is a top perspective view of the first swing member 2. To be more specific, FIG. 5A is a top perspective view of the first swing member 2 as disassembled. FIG. 5B is a bottom perspective view of the first swing member 2. To be more specific, FIG. 5B is a bottom perspective view of the lower holder 2D that constitutes the first swing member 2, and illustration of the upper 3C holder 2U that constitutes the first swing member 2 is omitted. Note that, in FIG. 5A and FIG. 5B, a cross pattern is imparted to the first front metal member 5AF and the first rear metal member 5AB for clarification.

The first front metal member 5AF is attached to the front wall part 2WF of the frame-like part 2F in the lower holder 2D, and the first rear metal member 5AB is attached to the rear wall part 2WB of the frame-like part 2F in the lower holder 2D.

To be more specific, the first front metal member 5AF is fixed to the frame-like part 2F by the adhesive applied to a rectangular hole AH1. The same applies to the first rear metal member 5AB.

A step 2S is formed on the inner peripheral surface of the frame-like part 2F of the lower holder 2D. The lower end part of the peripheral wall part 2A of the upper holder 2U is positioned by the step 2S when the upper holder 2U is placed in the lower holder 2D. Furthermore, the upper holder 2U and the lower holder 2D are joined with an adhesive.

The camera module CM (see FIG. 1A) is joined to the upper holder 2U with an adhesive, in a state in which the upper surface of the camera module CM (the cover of the lens drive device LD) and the ceiling surface of the upper plate part 2B of the upper holder 2U are in contact with each other.

With this configuration, the camera module CM is held by the upper holder 2U in a state in which the position in the optical axis direction is fixed. Note that, in this embodiment, the upper holder 2U and the lower holder 2D are joined before the camera module CM and the upper holder 2U are joined. Also, the upper holder 2U may also serve as a cover for the camera module CM (a cover for the lens drive device LD).

Figure 6A:
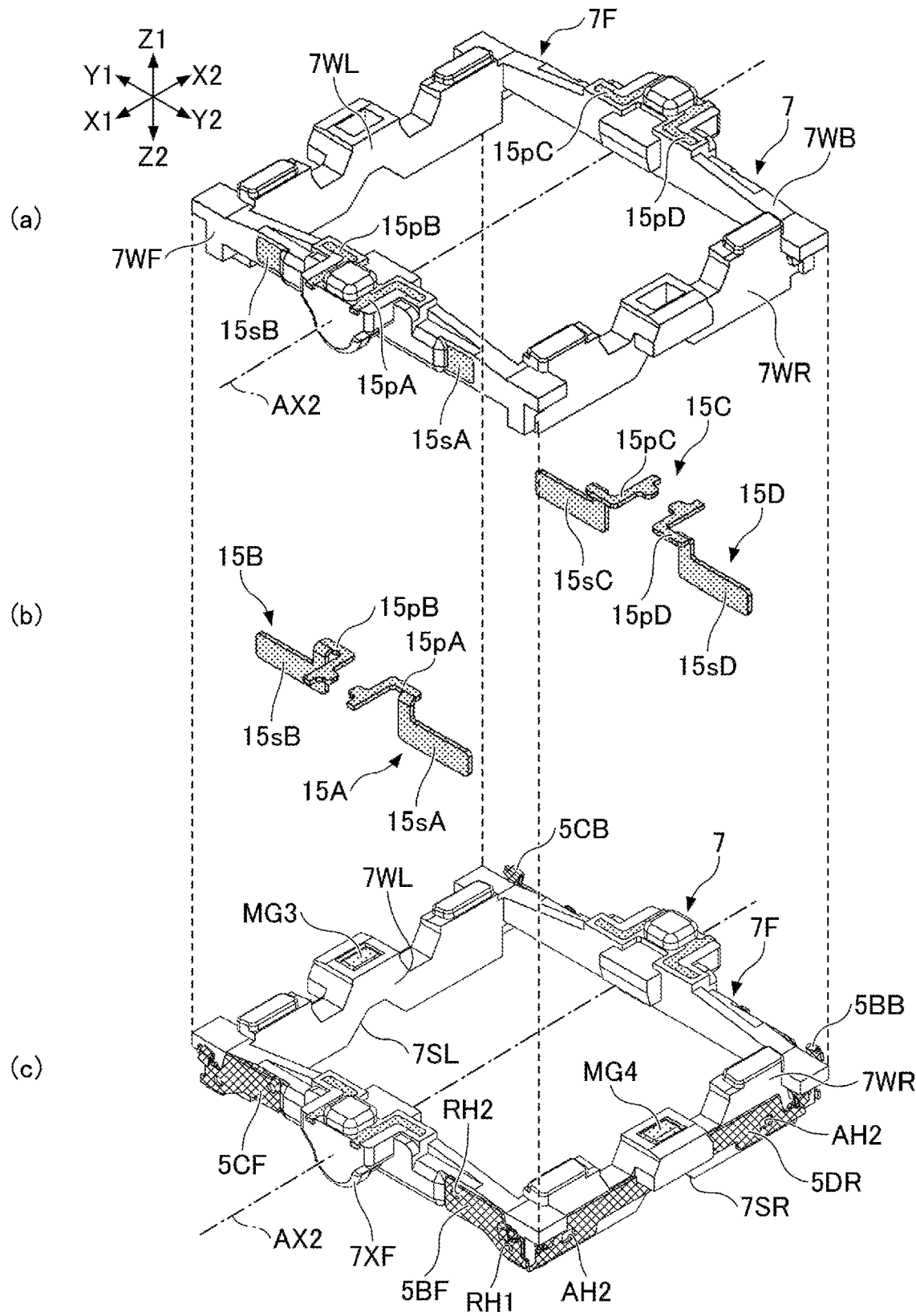
FIG. 6A is a top perspective view of a second swing member.
Figure 6B:
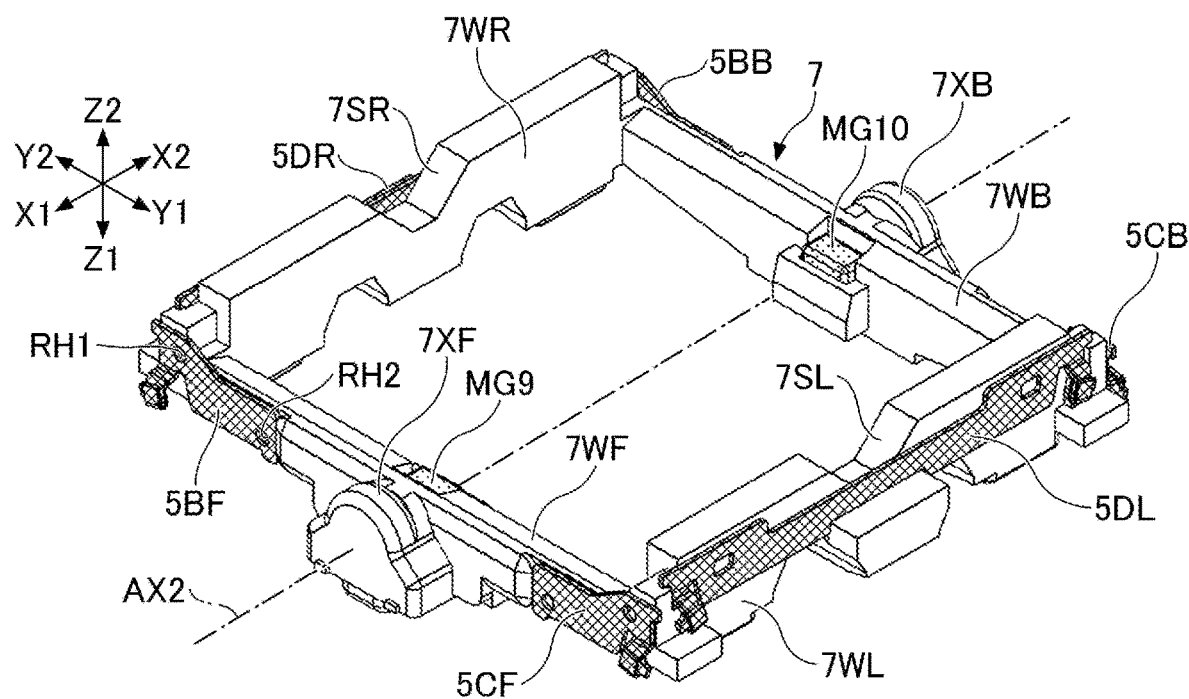
FIG. 6B is a bottom perspective view of the second swing member.

Next, an example configuration of the second swing member 7 will be described below with reference to FIG. 6A and FIG. 6B. FIG. 6A is a top perspective view of the second swing member 7. To be more specific, FIG. 6A(a) is a top perspective view of the second swing member 7 in which inner conductive members are embedded. FIG. 6A(b) is a top perspective view of the inner conductive members embedded in the second swing member 7. FIG. 6A(c) is a top perspective view of the second swing member 7 to which the metal members 5 are attached. FIG. 6B is a bottom perspective view of the second swing member 7. Note that, in FIG. 6A and FIG. 6B, a cross pattern is imparted to the metal members 5 for clarification.

The inner conductive members include a first inner conductive member 15A to a fourth inner conductive member 15D. In the following description, the first inner conductive member 15A to the fourth inner conductive member 15D may be referred to simply as inner conductive members 15 for ease of explanation. Also, in FIG. 6A and FIG. 6B, a fine dot pattern is imparted to the inner conductive members 15 for clarification.

In this embodiment, the inner conductive members 15 are formed with metal plates containing materials such as copper, iron, or an alloy containing these as main ingredients, and embedded in the second swing member 7 by insert-molding.

The first inner conductive member 15A has an upper surface connecting part 15pA that is exposed on the upper surface (the surface on the Z1 side) of the front wall part 7WF of the second swing member 7, and a side surface connecting part 15sA that is exposed on the front surface (the surface on the X1 side) of the front wall part 7WF of the second swing member 7.

The second inner conductive member 15B has an upper surface connecting part 15pB that is exposed on the upper surface of the front wall part 7WF of the second swing member 7, and a side surface connecting part 15sB that is exposed on the front surface of the front wall part 7WF of the second swing member 7.

The third inner conductive member 15C has an upper surface connecting part 15pC that is exposed on the upper surface of the rear wall part 7WB of the second swing member 7, and a side surface connecting part 15sC that is exposed on the rear surface (the surface on the X2 side) of the rear wall part 7WB of the second swing member 7.

The fourth inner conductive member 15D has an upper surface connecting part 15pD that is exposed on the upper surface of the rear wall part 7WB of the second swing member 7, and a side surface connecting part 15sD that is exposed on the rear surface of the rear wall part 7WB of the second swing member 7.

The second front metal member 5BF is welded to the side surface connecting part 15sA of the first inner conductive member 15A exposed on the front surface of the front wall part 7WF of the second swing member 7. The second front metal member 5BF may be joined to the side surface connecting part 15sA by using a conductive adhesive.

The third front metal member 5CF is welded to the side surface connecting part 15sB of the second inner conductive member 15B exposed on the front surface of the front wall part 7WF of the second swing member 7. The third front metal member 5CF may be joined to the side surface connecting part 15sB by using a conductive adhesive.

The second rear metal member 5BB is welded to the side surface connecting part 15sD of the fourth inner conductive member 15D exposed on the rear surface of the rear wall part 7WB of the second swing member 7. The second rear metal member 5BB may be joined to the side surface connecting part 15sD by using a conductive adhesive.

The third rear metal member 5CB is welded to the side surface connecting part 15sC of the third inner conductive member 15C exposed on the rear surface of the rear wall part 7WB of the second swing member 7. The third rear metal member 5CB may be joined to the side surface connecting part 15sC by using a conductive adhesive.

To be more specific, the second front metal member 5BF is fixed to the second swing member 7 by the adhesive applied to a round hole RH1 (see FIG. 6A(c)), and joined to the side surface connecting part 15sA by welding such as laser welding that takes place in a round hole RH2 (see FIG. 6A(c)). The same applies to the second rear metal member 5BB, the third front metal member 5CF, and the third rear metal member 5CB.

As illustrated in FIG. 6A, the fourth right metal member 5DR is glued to the right surface of the right wall part 7WR of the second swing member 7. As illustrated in FIG. 6B, the fourth left metal member 5DL is glued to the left surface of the left wall part 7WL of the second swing member 7.

To be more specific, the fourth right metal member 5DR is fixed to the second swing member 7 with an adhesive applied to a rectangular hole AH2 (see FIG. 6A(c)). The same applies to the fourth left metal member 5DL.

Figure 7:
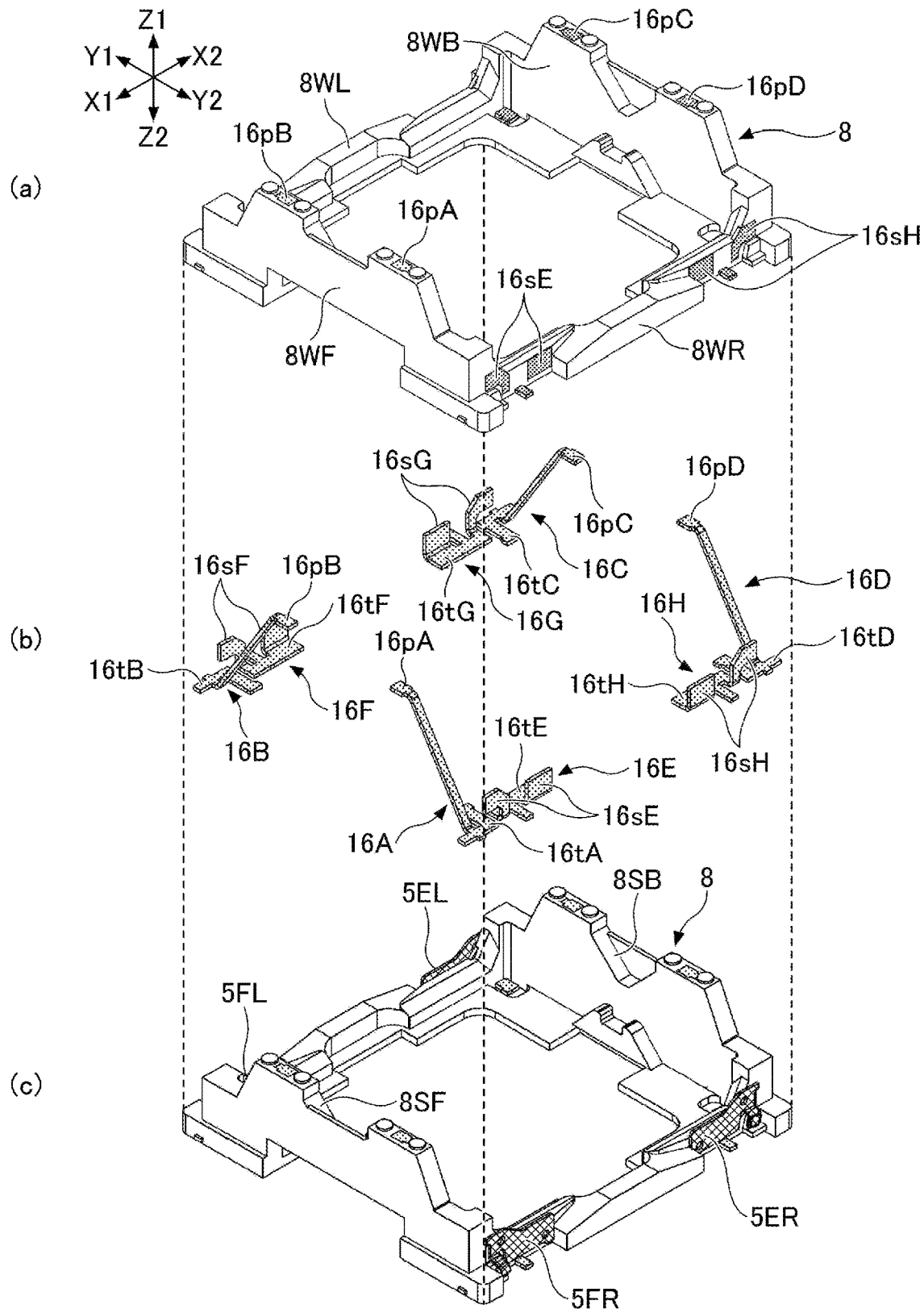
FIG. 7 is a top perspective view of a base member.

Next, an example configuration of the base member 8 will be described below with reference to FIG. 7. FIG. 7 is a top perspective view of the base member 8. To be more specific, FIG. 7(a) is a top perspective view of the base member 8 in which outer conductive members are embedded. FIG. 7(b) is a top perspective view of the outer conductive members embedded in the base member 8. FIG. 7(c) is a top perspective view of the base member 8 to which the metal members 5 are attached.

The outer conductive members include a first outer conductive member 16A to an eighth outer conductive member 16H. In the following description, the first outer conductive member 16A to the eighth outer conductive member 16H may be referred to simply as outer conductive members 16 for ease of explanation.

In this embodiment, the outer conductive members 16 are formed with metal plates containing materials such as copper, iron, or an alloy containing these as main ingredients, and embedded in the second swing member 7 by insert-molding.

The first outer conductive member 16A has an upper surface connecting part 16pA that is exposed on the upper surface (the surface on the Z1 side) of the front wall part 8WF of the base member 8, and a terminal part 16tA that is exposed on the lower surface (the surface on the Z2 side) of the base member 8.

The second outer conductive member 16B has an upper surface connecting part 16pB that is exposed on the upper surface of the front wall part 8WF of the base member 8, and a terminal part 16tB that is exposed on the lower surface of the base member 8.

The third outer conductive member 16C has an upper surface connecting part 16pC that is exposed on the upper surface of the rear wall part 8WB of the base member 8, and a terminal part 16tC that is exposed on the lower surface of the base member 8.

The fourth outer conductive member 16D has an upper surface connecting part 16pD that is exposed on the upper surface of the rear wall part 8WB of the base member 8, and a terminal part 16tD that is exposed on the lower surface of the base member 8.

The fifth outer conductive member 16E has a side surface connecting part 16sE that is exposed on the right surface (the surface on the Y2 side) of the right wall part 8WR of the base member 8, and a terminal part 16tE that is exposed on the lower surface of the base member 8.

The sixth outer conductive member 16F has a side surface connecting part 16sF that is exposed on the left surface (the surface on the Y1 side) of the left wall part 8WL of the base member 8, and a terminal part 16tF that is exposed on the lower surface of the base member 8.

The seventh outer conductive member 16G has a side surface connecting part 16sG that is exposed on the left surface of the left wall part 8WL of the base member 8, and a terminal part 16tG that is exposed on the lower surface of the base member 8.

The eighth outer conductive member 16H has a side surface connecting part 16sH that is exposed on the right surface of the right wall part 8WR of the base member 8, and a terminal part 16tH that is exposed on the lower surface of the base member 8.

The fifth right metal member 5ER is welded to the side surface connecting part 16sH of the eighth outer conductive member 16H exposed on the right surface of the right wall part 8WR of the base member 8. The fifth right metal member 5ER may be joined to the side surface connecting part 16sH by using a conductive adhesive.

The fifth left metal member 5EL is welded to the side surface connecting part 16sG of the seventh outer conductive member 16G exposed on the left surface of the left wall part 8WL of the base member 8. The fifth left metal member 5EL may be joined to the side surface connecting part 16sG by using a conductive adhesive.

The sixth right metal member 5FR is welded to the side surface connecting part 16sE of the fifth outer conductive member 16E exposed on the right surface of the right wall part 8WR of the base member 8. The sixth right metal member 5FR may be joined to the side surface connecting part 16sE by using a conductive adhesive.

The sixth left metal member 5FL is welded to the side surface connecting part 16sF of the sixth outer conductive member 16F exposed on the left surface of the left wall part 8WL of the base member 8. The sixth left metal member 5FL may be joined to the side surface connecting part 16sF by using a conductive adhesive.

Figure 8A:
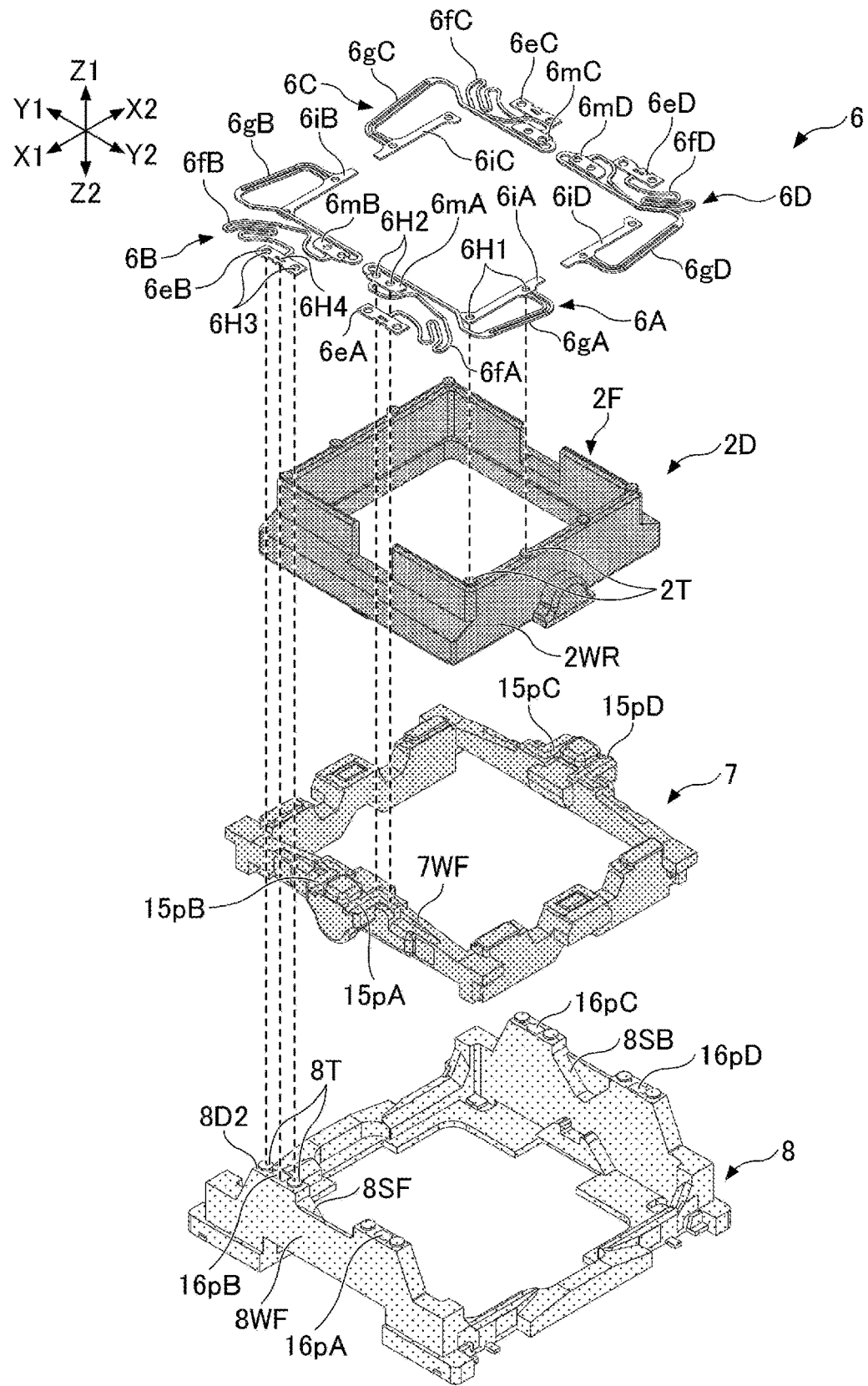
FIG. 8A is a top perspective view of leaf springs, the first swing member, the second swing member, and the base member.
Figure 8B:
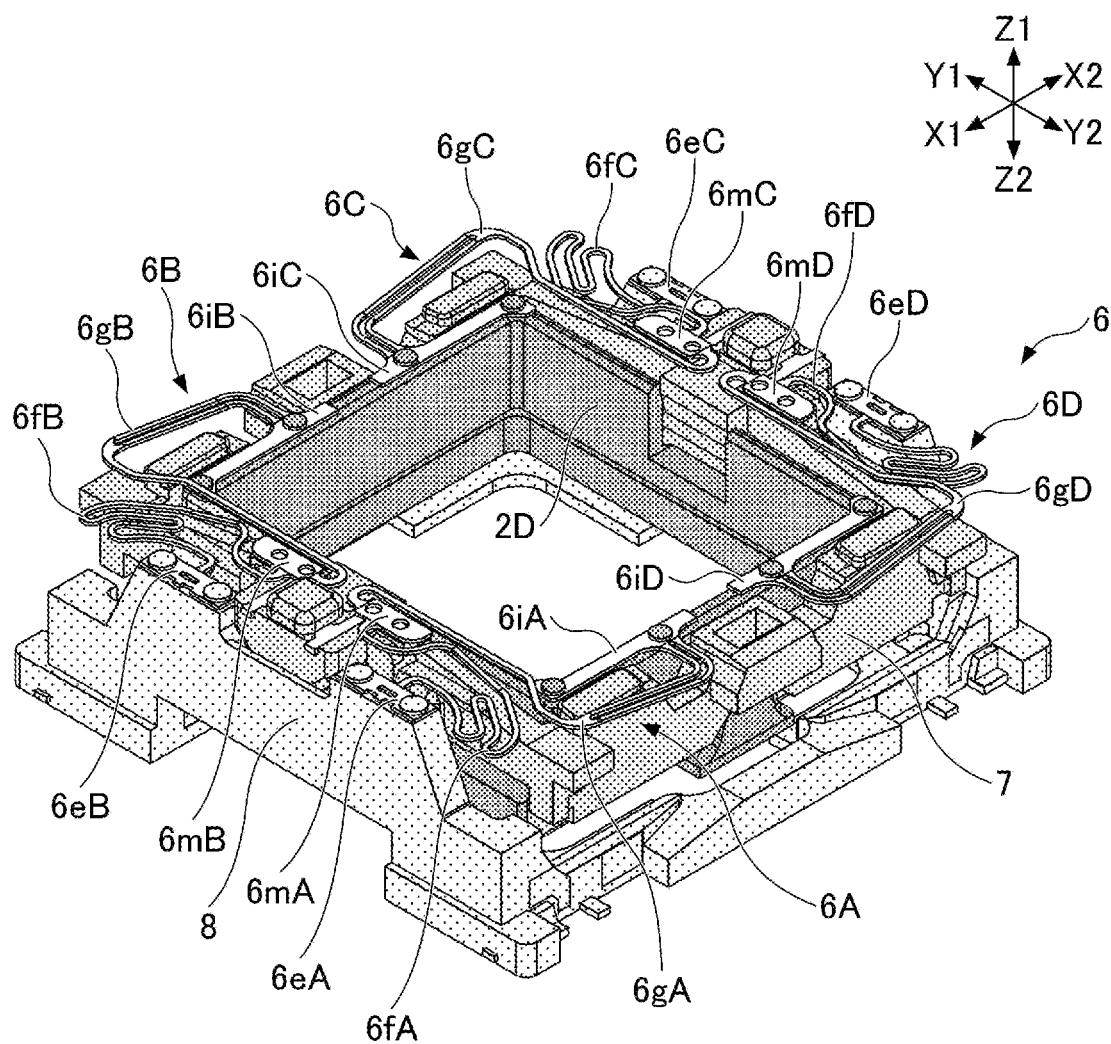
FIG. 8B is a top perspective view of the leaf springs, the first swing member, the second swing member, and the base member.
Figure 8C:
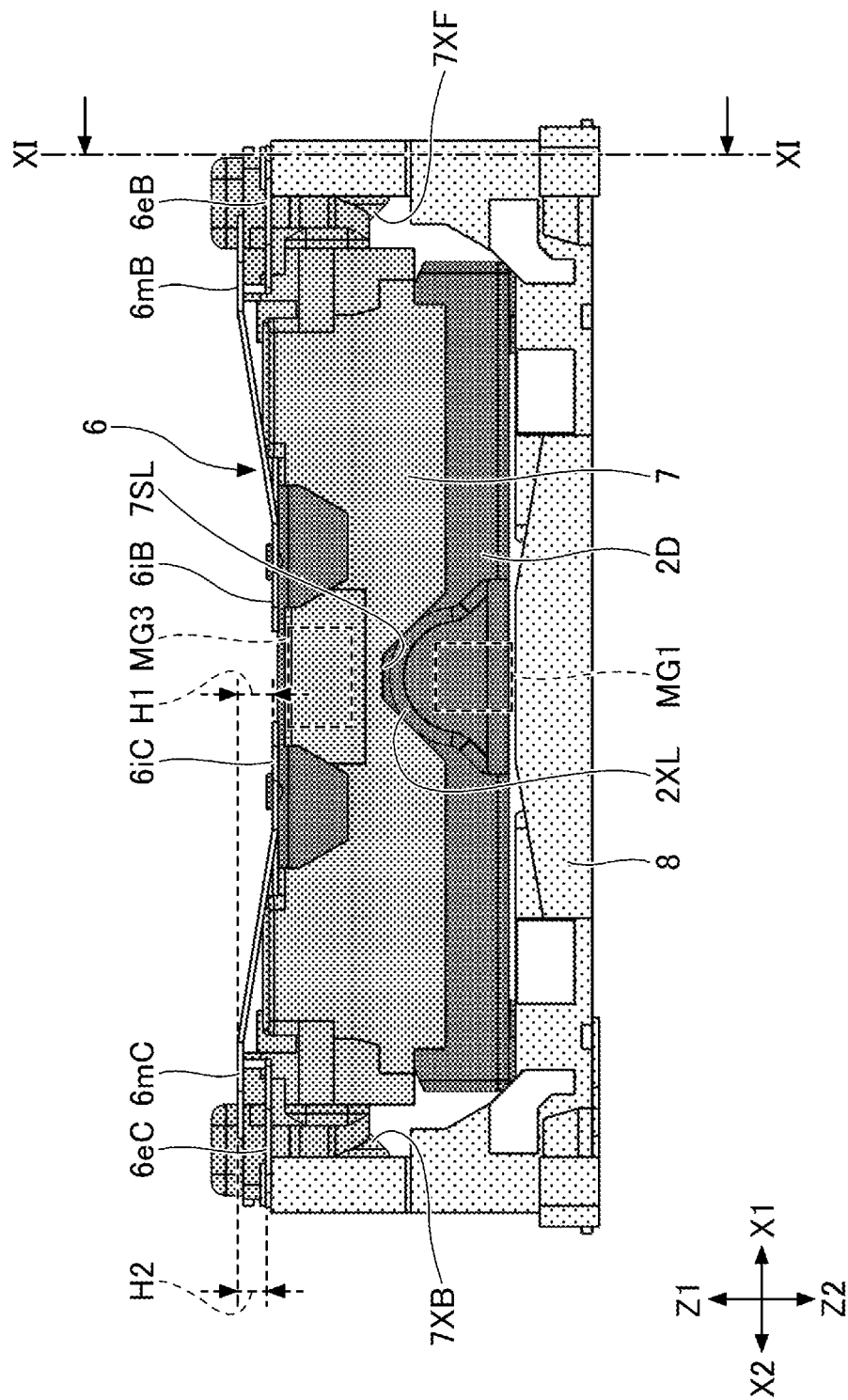
FIG. 8C is a left side view of the leaf springs, the first swing member, the second swing member, and the base member.

Next, how the leaf springs 6 are connected with each of the first swing member 2 (the lower holder 2D), the second swing member 7, and the base member 8 will be described below with reference to FIG. 8A to FIG. 8C. FIG. 8A is a top perspective view of the lower holder 2D, the leaf springs 6, the second swing member 7, and the base member 8 in a disassembled state. FIG. 8B is a top perspective view of the lower holder 2D, the leaf springs 6, the second swing member 7, and the base member 8 in an assembled state. FIG. 8C is a left side view of the lower holder 2D, the leaf spring 6, the second swing member 7, and the base member 8 in an assembled state. Note that, in FIG. 8A to FIG. 8C, illustration of the upper holder 2U that constitutes the first swing member 2 is omitted for clarification. Also, FIG. 8A to FIG. 8C impart a fine dot pattern to the lower holder 2D, a coarse dot pattern to the second swing member 7, and a coarser dot pattern to the base member 8 for clarification. The same applies to FIG. 10 and FIG. 11.

The leaf springs 6 are configured such that the first swing member 2 (the lower holder 2D), the second swing member 7, and the base member 8 can be connected. In this embodiment, the leaf springs 6 are formed with metal plates that are made of, for example, a copper alloy, a titanium-copper alloy (titanium copper), or a copper-nickel alloy (nickel-tin copper) as their main ingredient, and are configured to function as conductive paths. To be more specific, the leaf springs 6 include a first leaf spring 6A to a fourth leaf spring 6D.

The first leaf spring 6A is configured to connect the first swing member 2 (the lower holder 2D), the second swing member 7, and the base member 8. In this embodiment, the first leaf spring 6A has an inner portion 6iA that is fixed to the lower holder 2D, a middle portion 6mA that is fixed to the second swing member 7, an outer portion 6eA that is fixed to the base member 8, an inner elastic arm part 6gA that connects the inner portion 6iA and the middle portion 6mA, and an outer elastic arm part 6fA that connects the outer portion 6eA and the middle portion 6mA. Similarly, the second leaf spring 6B has an inner portion 6iB, a middle portion 6mB, an outer portion 6eB, an inner elastic arm part 6gB, and an outer elastic arm part 6fB. The third leaf spring 6C has an inner portion 6iC, a middle portion 6mC, an outer portion 6eC, an inner elastic arm part 6gC, and an outer elastic arm part 6fC. The fourth leaf spring 6D has an inner portion 6iD, a middle portion 6mD, an outer portion 6eD, an inner elastic arm part 6gD, and an outer elastic arm part 6fD. Below, for ease of explanation, the inner portion 6iA to the inner portion 6iD may be referred to simply as inner portions 6i, the middle portion 6mA to the middle portion 6mD may be referred to simply as middle portions 6m, the outer portion 6eA to the outer portion 6eD may be referred to simply as outer portions 6e, the inner elastic arm part 6gA to the inner elastic arm part 6gD may be referred to simply as inner elastic arm parts 6g, and the outer elastic arm part 6fA to the outer elastic arm part 6fD may be referred to simply as outer elastic arm parts 6f.

As shown by the broken lines in FIG. 8A, the inner portion 6iA of the first leaf spring 6A is fixed on the upper end of the right wall part 2WR of the frame-like part 2F of the lower holder 2D. In the inner portion 6iA, two first through holes 6H1 are formed. Two protruding parts 2T that are formed at the upper end of the right wall part 2WR of the frame-like part 2F and that protrude upward are inserted in the two first through holes 6H1. According to this embodiment, the inner portion 6iA and the protruding parts 2T are fixed with each other by applying hot or cold caulking to the protruding parts 2T. However, the inner portion 6iA and the protruding parts 2T may be fixed with each other by using an adhesive. The same applies to the inner portion 6iB of the second leaf spring 6B, the inner portion 6iC of the third leaf spring 6C, and the inner portion 6iD of the fourth leaf spring 6D.

As shown by the dashed lines in FIG. 8A, the middle portion 6mA of the first leaf spring 6A is fixed to the upper surface connecting part 15pA of the first inner conductive member 15A that is exposed on the upper surface of the front wall part 7WF of the second swing member 7. Two second through holes 6H2 for joining the middle portion 6mA with the upper surface connecting part 15pA are formed in the middle portion 6mA. In this embodiment, the middle portion 6mA and the upper surface connecting part 15pA are joined by welding such as laser welding that takes place in the second through hole 6H2. However, the middle portion 6mA and the upper surface connecting part 15pA may be joined by soldering, by using a conductive adhesive, and so forth. The same applies to the middle portion 6mB of the second leaf spring 6B, the middle portion 6mC of the third leaf spring 6C, and the middle portion 6mD of the fourth leaf spring 6D.

As shown by the dashed lines in FIG. 8A, the outer portion 6eB of the second leaf spring 6B is placed on the upper surface of the second pedestal part 8D2 formed on the front wall part 8WF of the base member 8. Furthermore, the outer portion 6eB of the second leaf spring 6B is fixed to the upper surface connecting part 16pB of the second outer conductive member 16B that is exposed on the upper surface of the second pedestal part 8D2. In the outer portion 6eB, two third through holes 6H3 and a fourth through hole 6H4 are formed. In the two third through holes 6H3, two protruding parts 8T that are formed on the upper surface of the second pedestal part 8D2 and that protrude upward are inserted. The fourth through hole 6H4 is used for joining the outer portion 6eB with the upper surface connecting part 16pB of the second outer conductive member 16B. In this embodiment, the outer portion 6eB and the protruding parts 8T are fixed with each other by applying hot or cold caulking to the protruding parts 8T. However, the outer portion 6eB and the protruding parts 8T may be fixed with each other by using an adhesive. Also, the outer portion 6eB and the upper surface connecting part 16pB are joined by welding such as laser welding that takes place in the fourth through hole 6H4. However, the outer portion 6eB and the upper surface connecting part 16pB may be joined by soldering, by using a conductive adhesive, and so forth. The same applies to the outer portion 6eA of the first leaf spring 6A, the outer portion 6eC of the third leaf spring 6C, and the outer portion 6eD of the fourth leaf spring 6D.

Also, as illustrated in FIG. 8C, the third leaf spring 6C is fixed to the first swing member 2 (the lower holder 2D) and the second swing member 7 such that the height of the middle portion 6mC is higher than the height of the inner portion 6iC by a height H1. With this configuration, the third leaf spring 6C, having the middle portion 6mC and the inner portion 6iC, functions as a first preloading member that exerts a force that causes the pair of axis parts 2X (the left axis part 2XL and the right axis part 2XR) and the pair of receiving parts 7S (the left receiving part 7SL and the right receiving part 7SR) to press against each other. Also, as illustrated in FIG. 8C, the third leaf spring 6C is fixed to the second swing member 7 and the base member 8 such that the height of the middle portion 6mC is higher than the height of the outer portion 6eC by a height H2. With this configuration, the third leaf spring 6C, having the middle portion 6mC and the outer portion 6eC, functions as a second preloading member that exerts a force that causes the pair of axis parts 7X (the front axis part 7XF and the rear axis part 7XB) and the pair of receiving parts 8S (the front receiving part 8SF and the rear receiving part 8SB) to press against each other. The same applies to the first leaf spring 6A, the second leaf spring 6B, and the fourth leaf spring 6D.

Figure 9A:
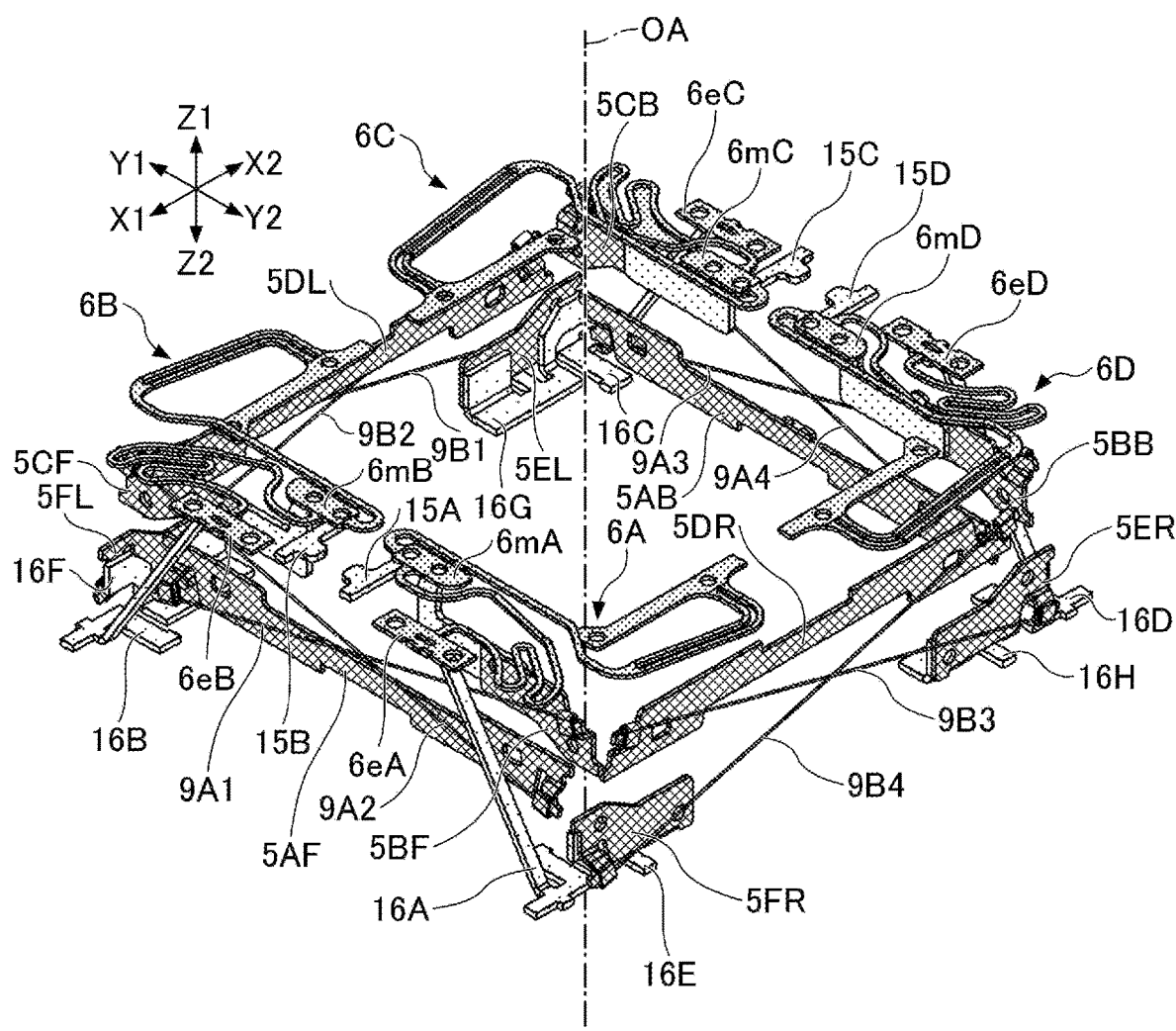
FIG. 9A is a top perspective view of the metal members, the leaf springs, the shape memory alloy wires, inner conductive members, and outer conductive members.

Next, the positional relationships among the metal members 5, the leaf springs 6, the shape memory alloy wires 9, the inner conductive members 15, and the outer conductive members 16 will be described below with reference to FIG. 9A to FIG. 9C. FIG. 9A is a top perspective view of the metal members 5, the leaf springs 6, the shape memory alloy wires 9, the inner conductive members 15, and the outer conductive members 16 in an assembled state.

Figure 9B:
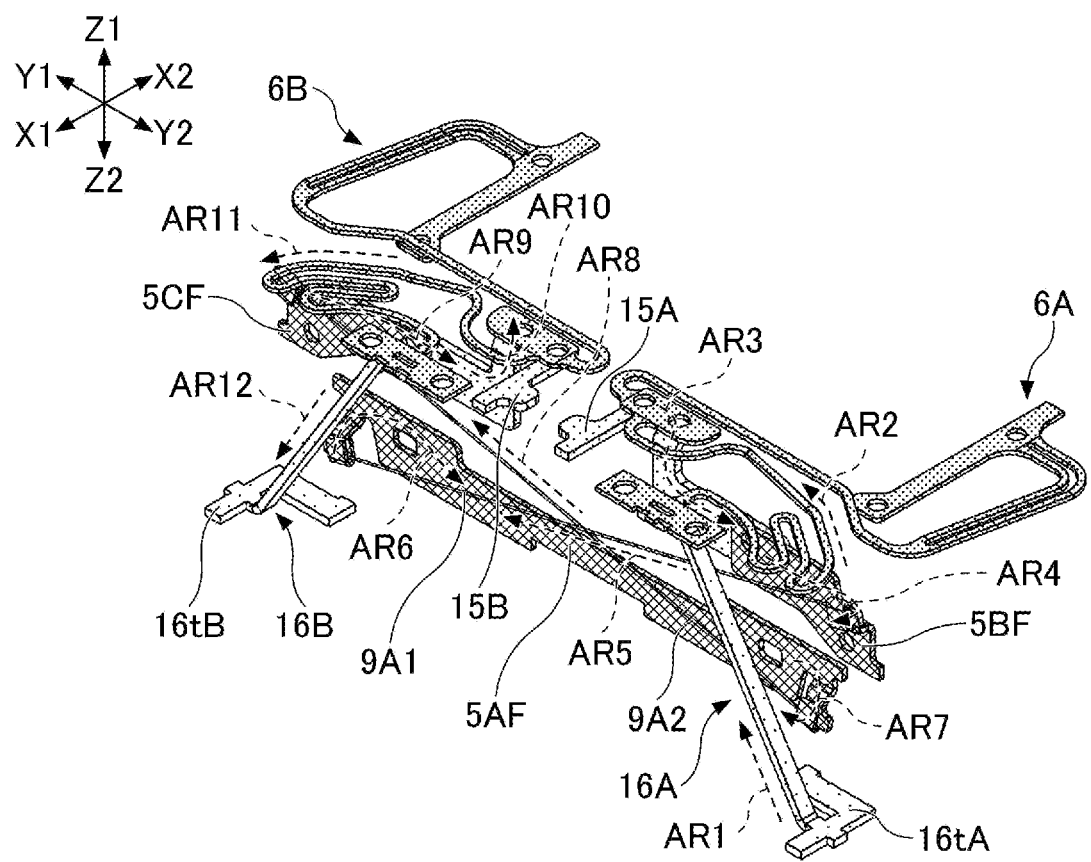
FIG. 9B is an enlarged view of a part of FIG. 9A.

FIG. 9B is a top perspective view of the first front metal member 5AF, the second front metal member 5BF, the third front metal member 5CF, the first leaf spring 6A, the second leaf spring 6B, the first inner wire 9A1, the second inner wire 9A2, the first inner conductive member 15A, the second inner conductive member 15B, the first outer conductive member 16A, and the second outer conductive member 16B, and corresponds to a diagram obtained by extracting a part of FIG. 9A.

Figure 9C:
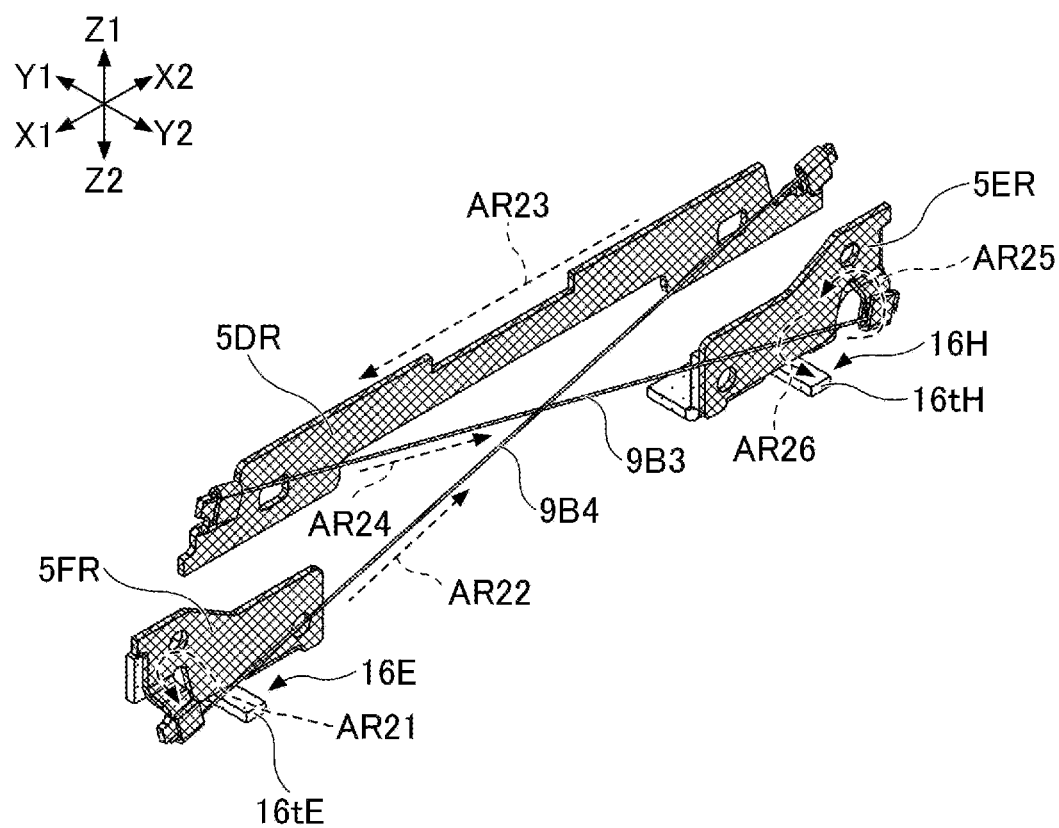
FIG. 9C is an enlarged view of a part of FIG. 9A.

FIG. 9C is a top perspective view of the fourth right metal member 5DR, the fifth right metal member 5ER, the sixth right metal member 5FR, the third outer wire 9B3, the fourth outer wire 9B4, the fifth outer conductive member 16E and the eighth outer conductive member 16H, and corresponds to a diagram obtained by extracting a part of FIG. 9A.

Note that, for clarification, FIG. 9A to FIG. 9C impart a cross pattern to the metal members 5, a fine dot pattern to the leaf springs 6, a coarse dot pattern to the inner conductive members 15, and a coarser dot pattern to the outer conductive members 16.

As illustrated in FIG. 9A, the first leaf spring 6A to the fourth leaf spring 6D all have the same shape, and are arranged so as to be two-fold rotationally-symmetric with respect to the optical axis OA. Therefore, this configuration can reduce the number of parts of the optical module drive device 101. Furthermore, the leaf springs 6, constituted by the first leaf spring 6A to the fourth leaf spring 6D, can support the first swing member 2 and the second swing member 7 in a well-balanced manner relative to the base member 8.

The outer portion 6eA of the first leaf spring 6A is joined to the upper surface connecting part 16pA (see FIG. 7(b)) of the first outer conductive member 16A by welding.

The outer portion 6eB of the second leaf spring 6B is joined to the upper surface connecting part 16pB (see FIG. 7(b)) of the second outer conductive member 16B by welding.

The outer portion 6eC of the third leaf spring 6C is joined to the upper surface connecting part 16pC (see FIG. 7(b)) of the third outer conductive member 16C by welding.

The outer portion 6eD of the fourth leaf spring 6D is joined to the upper surface connecting part 16pD (see FIG. 7(b)) of the fourth outer conductive member 16D by welding.

The middle portion 6mA of the first leaf spring 6A is joined to the upper surface connecting part 15pA (see FIG. 6A(b)) of the first inner conductive member 15A by welding.

The middle portion 6mB of the second leaf spring 6B is joined to the upper surface connecting part 15pB (see FIG. 6A(b)) of the second inner conductive member 15B by welding.

The middle portion 6mC of the third leaf spring 6C is joined to the upper surface connecting part 15pC (see FIG. 6A(b)) of the third inner conductive member 15C by welding.

The middle portion 6mD of the fourth leaf spring 6D is joined to the upper surface connecting part 15pD (see FIG. 6A(b)) of the fourth inner conductive member 15D by welding.

The side surface connecting part 15sA (see FIG. 6A(b)) of the first inner conductive member 15A is joined to the second front metal member 5BF by welding.

The side surface connecting part 15sB (see FIG. 6A(b)) of the second inner conductive member 15B is joined to the third front metal member 5CF by welding.

The side surface connecting part 15sC (see FIG. 6A(b)) of the third inner conductive member 15C is joined to the third rear metal member 5CB by welding.

The side surface connecting part 15sD (see FIG. 6A(b)) of the fourth inner conductive member 15D is joined to the second rear metal member 5BB by welding.

The side surface connecting part 16sE (see FIG. 7(b)) of the fifth outer conductive member 16E is joined to the sixth right metal member 5FR by welding.

The side surface connecting part 16sF (see FIG. 7(b)) of the sixth outer conductive member 16F is joined to the sixth left metal member 5FL by welding.

The side surface connecting part 16sG (see FIG. 7(b)) of the seventh outer conductive member 16G is joined to the fifth left metal member 5EL by welding.

The side surface connecting part 16sH (see FIG. 7(b)) of the eighth outer conductive member 16H is joined to the fifth right metal member 5ER by welding.

The second front metal member 5BF is connected to the first front metal member 5AF via the first inner wire 9A1, and the third front metal member 5CF is connected to the first front metal member 5AF via the second inner wire 9A2.

The second rear metal member 5BB is connected to the first rear metal member 5AB via the third inner wire 9A3, and the third rear metal member 5CB is connected to the first rear metal member 5AB via the fourth inner wire 9A4.

The fifth left metal member 5EL is connected to the fourth left metal member 5DL via the first outer wire 9B1, and the sixth left metal member 5FL is connected to the fourth left metal member 5DL via the second outer wire 9B2.

The fifth right metal member 5ER is connected to the fourth right metal member 5DR via the third outer wire 9B3, and the sixth right metal member 5FR is connected to the fourth right metal member 5DR via the fourth outer wire 9B4.

The terminal part 16tA to the terminal part 16tH (see FIG. 7(b)) are connected to a conductive pattern (not shown) formed on the upper surface of the insulating circuit board 10 by solder or a conductive adhesive.

Next, the path of electric current flow through the first shape memory alloy wires 9A will be described below with reference to FIG. 9B. To be more specific, FIG. 9B illustrates the path of electric current in the event the terminal part 16tA of the first outer conductive member 16A is connected to a high potential, and the terminal part 16tB of the second outer conductive member 16B is connected to a low potential. The following description will illustrate the path of an electric current that flows from the terminal part 16tA to the terminal part 16tB through the first inner wire 9A1 and the second inner wire 9A2. However, the following description also applies to the path of an electric current that flows from the terminal part 16tB to the terminal part 16tA through the second inner wire 9A2 and the first inner wire 9A1, and applies to the path of an electric current that flows through the third inner wire 9A3 and the fourth inner wire 9A4 as well.

When the terminal part 16tA of the first outer conductive member 16A is connected to a high potential and the terminal part 16tB of the second outer conductive member 16B is connected to a low potential, an electric current flows from the terminal part 16tA to the first leaf spring 6A through the first outer conductive member 16A as indicated by an arrow AR1 in FIG. 9B. Following this, the electric current passes through the first leaf spring 6A as indicated by an arrow AR2, passes through the first inner conductive member 15A as indicated by an arrow AR3, passes through the second front metal member 5BF as indicated by an arrow AR4, passes through the first inner wire 9A1 as indicated by an arrow AR5, and, furthermore, passes through the first front metal member 5AF as indicated by an arrow AR6 and an arrow AR7. After that, the electric current passes through the second inner wire 9A2 as indicated by an arrow AR8, passes through the third front metal member 5CF as indicated by an arrow AR9, passes through the second inner conductive member 15B as indicated by an arrow AR10, passes through the second leaf spring 6B as indicated by an arrow AR11, and passes through the second outer conductive member 16B, into the terminal part 16tB, as indicated by an arrow AR12.

When the terminal part 16tB of the second outer conductive member 16B is connected to a high potential and the terminal part 16tA of the first outer conductive member 16A is connected to a low potential, an electric current flows to trace back the above path.

Next, the path of electric current flow through the second shape memory alloy wires 9B will be described below with reference to FIG. 9C. To be more specific, FIG. 9C illustrates the path of electric current in the event the terminal part 16tE of the fifth outer conductive member 16E is connected to a high potential and the terminal part 16tH of the eighth outer conductive member 16H is connected to a low potential. The following description will illustrate the path of an electric current that flows from the terminal part 16tE to the terminal part 16tH through the fourth outer wire 9B4 and the third outer wire 9B3. However, the following description also applies to the path of an electric current that flows from the terminal part 16tH to the terminal part 16tE through the third outer wire 9B3 and the fourth outer wire 9B4, and applies to the path of an electric current that flows through the first outer wire 9B1 and the second outer wire 9B2 as well.

When the terminal part 16tE of the fifth outer conductive member 16E is connected to a high potential and the terminal part 16tH of the eighth outer conductive member 16H is connected to a low potential, an electric current flows from the terminal part 16tE to the sixth right metal member 5FR through the fifth outer conductive member 16E as indicated by an arrow AR21 in FIG. 9C. Following this, the electric current passes through the fourth outer wire 9B4 as indicated by an arrow AR22, passes through the fourth right metal member 5DR as indicated by an arrow AR23, passes through the third outer wires 9B3 as indicated by an arrow AR24, passes through the fifth right metal member 5ER as indicated by an arrow AR25, and passes through the eighth outer conductive member 16H, into the terminal part 16tH, as indicated by an arrow AR26.

When the terminal part 16tH of the eighth outer conductive member 16BH is connected to a high potential and the terminal part 16tE of the fifth outer conductive member 16E is connected to a low potential, an electric current flows to trace back the above path.

The optical module drive device 101 is controlled by a control device. The control device is typically a device that is installed outside the optical module drive device 101, and connected to the optical module drive device 101 via the insulating circuit board 10.

The control device can control the contraction of the eight shape memory alloy wires 9 individually by, for example, controlling the voltage applied to each of the terminal part 16tA to the terminal part 16tH. Alternatively, the control device can control the contraction of the eight shape memory alloy wires 9 individually by controlling the electric current supplied to each of the eight shape memory alloy wires 9 via the terminal part 16tA to the terminal part 16tH. Furthermore, for example, the control device can utilize the driving force produced by the contraction of the shape memory alloy wires 9 serving as drive parts DM, and make the movable member MB swing. By making the movable members MB swing thus, the control device can implement a camera shake correction function, which is one of the lens adjustment functions.

Figure 10:
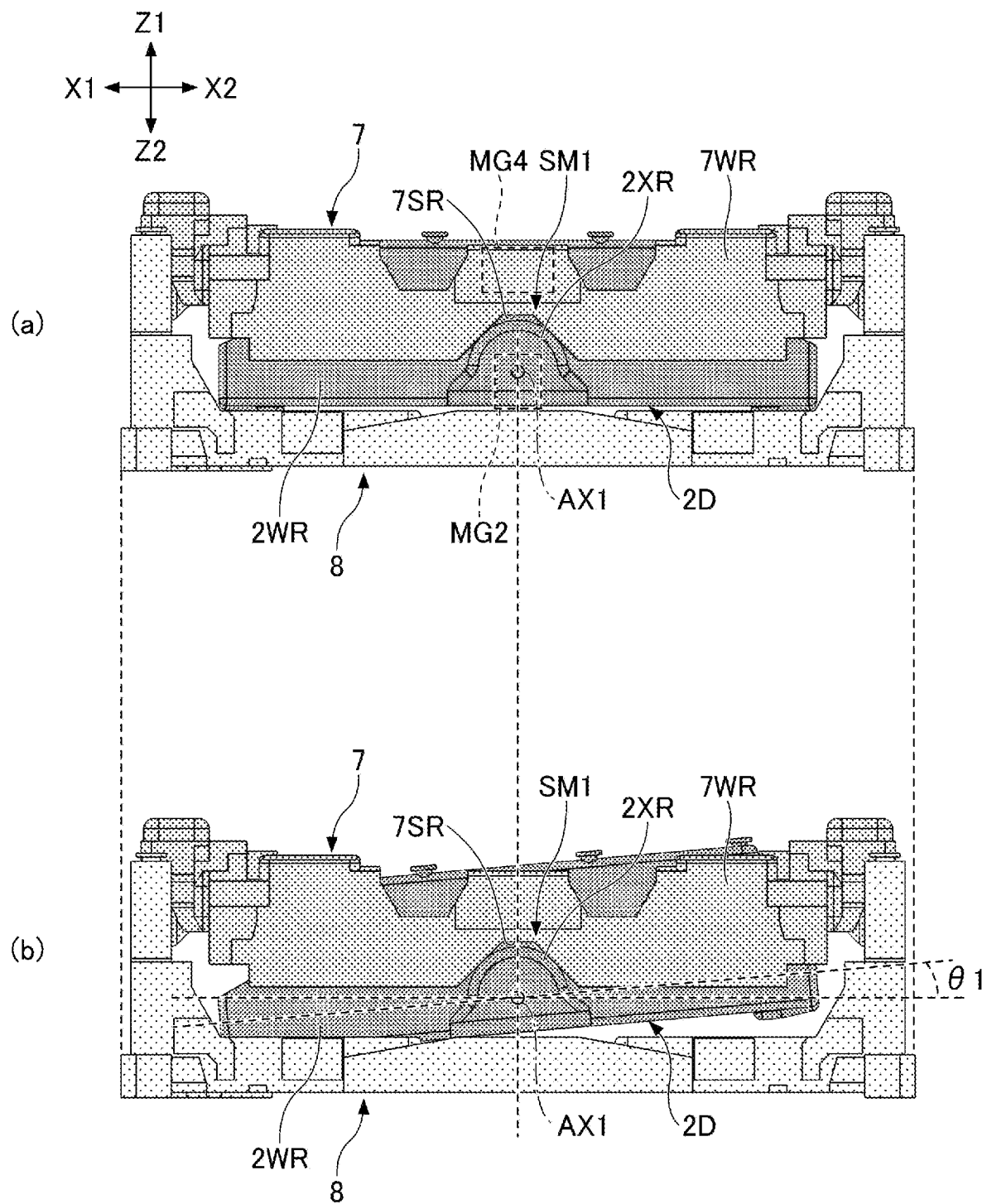
FIG. 10 is a right side view of the first swing member, the second swing member, and the base member.

Next, the configuration for making the first swing member 2 swing relative to the second swing member 7 will be described below with reference to FIG. 10. FIG. 10 is a right side view of the first swing member 2 (the lower holder 2D), the second swing member 7, and the base member 8 in an assembled state. To be more specific, FIG. 10(a) is a right side view of the first swing member 2 (the lower holder 2D), the second swing member 7, and the base member 8 in which the optical module drive device 101 is in an initial state. FIG. 10(b) is a right side view of the first swing member 2 (the lower holder 2D), the second swing member 7, and the base member 8, when the first swing member 2 (the lower holder 2D) swings counterclockwise about the first swing axis AX1 by an angle θ1.

The initial state of the optical module drive device 101 refers to the state of the optical module drive device 101 in which no electric current is supplied to the shape memory alloy wires 9 constituting the drive parts DM. In this initial state, the optical axis direction and the axial direction of the first swing axis AX1 are perpendicular to each other, and the optical axis direction and the axial direction of the second swing axis AX2 are perpendicular to each other. Note that the above initial state can also be referred to as a neutral state, in which the first swing member 2 and the second swing member 7 that are swung by the drive parts DM are located in neutral locations.

As illustrated in FIG. 10, the right axis part 2XR, which protrudes to the right, is formed in the middle portion of the right wall part 2WR of the lower holder 2D. In this embodiment, the right axis part 2XR has a semi-cylindrical outer shape that is projecting upward, and is received in the right receiving part 7SR, which is formed in the middle portion of the right wall part 7WR of the second swing member 7 and recessed upward. Also, although not illustrated in FIG. 10, in FIG. 5B, the left axis part 2XL, which protrudes to the left, is formed in the middle portion of the left wall part 2WL of the lower holder 2D. In this embodiment, the left axis part 2XL has a semi-cylindrical outer shape that is projecting upward, and is received in the left receiving part 7SL, which is formed in the middle portion of the left wall part 7WL of the second swing member 7 and recessed upward, as illustrated in FIG. 6A.

Furthermore, the pair of axis parts 2X (the left axis part 2XL and the right axis part 2XR) formed in the lower holder 2D and the pair of receiving parts 7S (the left receiving part 7SL and the right receiving part 7SR) formed in the second swing member 7 constitute a first swing mechanism SM1. The first swing mechanism SM1 is a part of the swing mechanism SM, and is a mechanism for making the first swing member 2 swing about the first swing axis AX1 relative to the second swing member 7. Note that, although the pair of receiving parts 7S are configured to have a substantially V-groove shape so as to fit with the pair of axis parts 2X having a semi-cylindrical outer shape, the pair of receiving parts 7S may be configured in a semi-circular groove shape as well. Also, although the pair of axis parts 2X and the pair of receiving parts 7S are configured to make line contact with each other along the first swing axis AX1, they may be configured to be in surface contact with each other as well.

In the example illustrated in FIG. 10, the first swing mechanism SM1 is constituted by a pair of axis parts 2X, which are formed in the lower holder 2D and projecting upward, and a pair of receiving parts 7S, which are formed in the second swing member 7 and recessed upward. However, the first swing mechanism SM1 may be constituted by a pair of downwardly recessed receiving parts formed in the lower holder 2D and a pair of downwardly projecting axis parts formed in the second swing member 7.

In the example shown in FIG. 10(b), where the third inner wire 9A3 and the fourth inner wire 9A4 form the first rear wire pair located behind (on the X2 side of) the first swing member 2 (the lower holder 2D), the control device can make the first swing member 2 (the lower holder 2D) swing counterclockwise about the first swing axis AX1 in right side view, by making the third inner wire 9A3 and the fourth inner wire 9A4 contract. Also, where the first inner wire 9A1 and the second inner wire 9A2 form the first front wire pair located in front of (on the X2 side of) the first swing member 2 (the lower holder 2D), the control device can make the first swing member 2 (the lower holder 2D) swing clockwise about the first swing axis AX1 in right side view, by making the first inner wire 9A1 and the second inner wire 9A2 contract.

Figure 11:
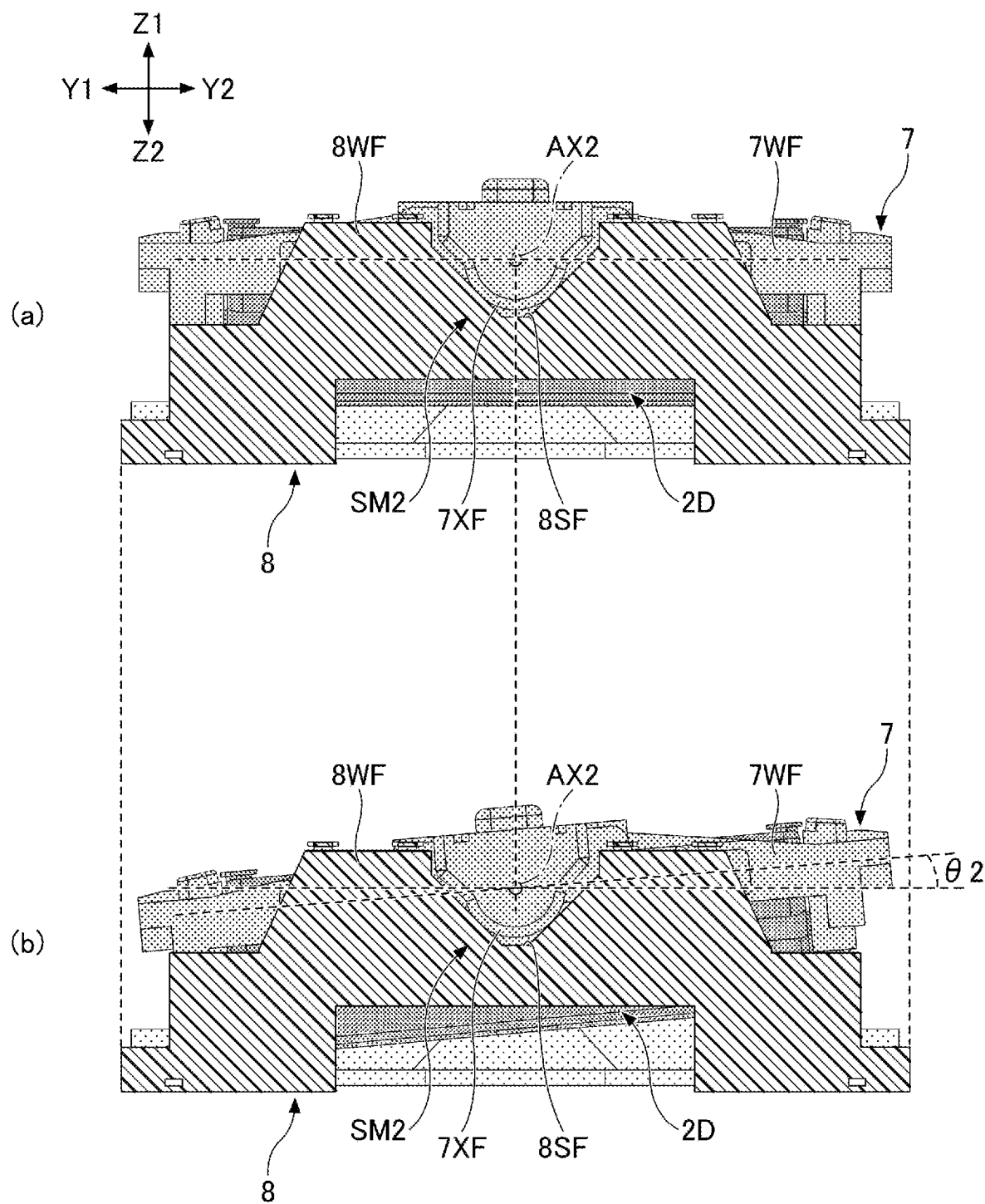
FIG. 11 is a front view of the first swing member, the second swing member, and the base member, illustrating a part of the base member in cross section.

Next, the configuration for making the second swing member 7 swing relative to the base member 8 will be described below with reference to FIG. 11. FIG. 11 is a front view of the first swing member (the lower holder 2D), the second swing member 7, and the base member 8 in an assembled state, and illustrates a cross section of the base member 8, where a virtual plane (cross section) that is parallel to the YZ plane including alternate long and short dash line XI-XI illustrated in FIG. 8C is viewed from the X1 side as shown by the arrows. To be more specific, FIG. 11(a) is a front view of the first swing member 2 (the lower holder 2D), the second swing member 7, and the base member 8 in which the optical module drive device 101 is in an initial state. FIG. 11(b) is a front view of the second swing member 2 (the lower holder 2D), the second swing member 7, and the base member 8, when the second swing member 7 swings counterclockwise about the second swing axis 2 by an angle θ2.

As illustrated in FIG. 11, the front axis part 7XF, which protrudes forward, is formed in the middle portion of the front wall part 7WF of the second swing member 7. In this embodiment, the front axis part 7XF has a semi-cylindrical outer shape that is projecting downward, and is received in the front receiving part 8SF that is formed in the middle portion of the front wall part 8WF of the base member 8 and recessed downward. Also, although not illustrated in FIG. 11, in FIG. 6B, the rear axis part 7XB, which protrudes rearward, is formed in the middle portion of the rear wall part 7WB of the second swing member 7. In this embodiment, the rear axis part 7XB has a semi-cylindrical outer shape that is projecting downward, and is received in the rear receiving part 8SB, which is formed in the middle portion of the rear wall part 8WB of the base member 8 and recessed downward, as illustrated in FIG. 7.

Furthermore, the pair of axis parts 7X (the front axis part 7XF and the rear axis part 7XB) formed in the second swing member 7 and the pair of receiving parts 8S (the front receiving part 8SF and the rear receiving part 8SB) formed in the base member 8 constitute a second swing mechanism SM2. The second swing mechanism SM2 is a part of the swing mechanism SM, and is a mechanism for making the second swing member 7 swing about the second swing axis AX2 relative to the base member 8. Note that the second swing mechanism SM2 makes the first swing member 2 swing with the second swing member 7 about the second swing axis AX2. Also, although the pair of receiving parts 8S are configured to have a substantially V-groove shape so as to fit with the pair of axis parts 7X having a semi-cylindrical outer shape, the pair of receiving parts 8S may be configured in a semi-circular groove shape as well. Also, although the pair of axis parts 7X and the pair of receiving parts 8S are configured to make line contact with each other along the second swing axis AX2, they may be configured to be in surface contact with each other as well.

In the example illustrated in FIG. 11, the second swing mechanism SM2 is constituted by a pair of downwardly projecting axis parts 7X formed in the second swing member 7 and a pair of downwardly recessed receiving parts 8S formed in the base member 8. However, the second swing mechanism SM2 may be constituted by a pair of upwardly recessed receiving parts formed in the second swing member 7 and a pair of upwardly projecting axis parts formed in the base member 8.

In the example shown in FIG. 11(b), the first outer wire 9B1 and the second outer wire 9B2 form the second left wire pair located on the left side (the Y1 side) of the second swing member 7, and the control device can make the second swing member 7 swing counterclockwise about the second swing axis AX2 in front view by making the first outer wire 9B1 and the second outer wire 9B2 contract. Also, where the third outer wire 9B3 and the fourth outer wire 9B4 form the second right wire pair located on the right side (the Y2 side) of the second swing member 7, the control device can make the second swing member 7 swing clockwise about the second swing axis AX2 in front view by making the third outer wire 9B3 and the fourth outer wire 9B4 contract.

Figure 12B:
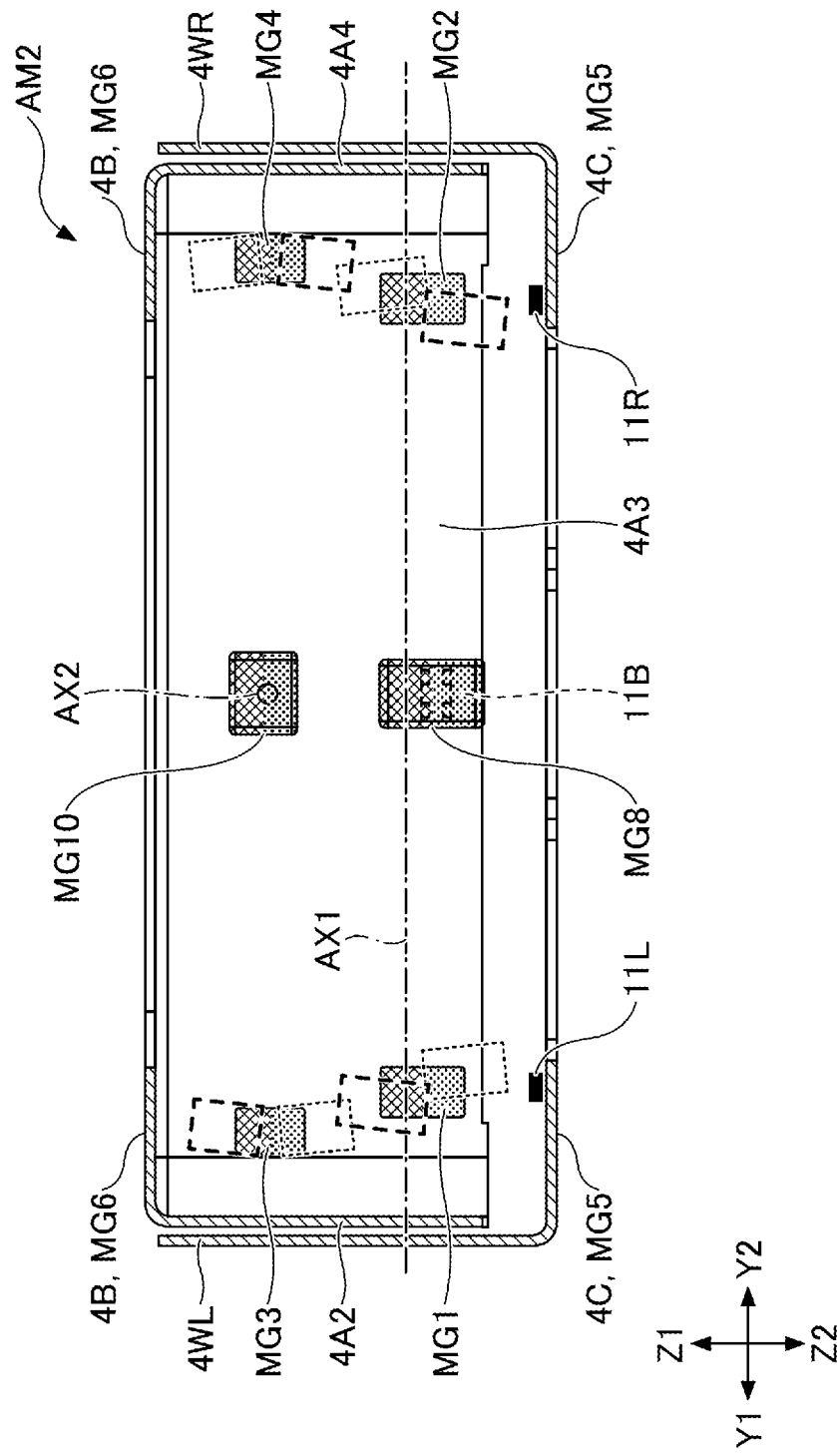
FIG. 12B is a cross-sectional view of the cover members and the magnetic members.

Next, the arrangement of magnetic sensors 11 for detecting the swinging state of the movable member MB will be described below with reference to FIG. 12A and FIG. 12B. FIG. 12A is a cross-sectional view of the cover members and the magnetic members, and illustrates a cross section of the cover members 4 and magnetic members, where a virtual plane that is parallel to the XZ plane including alternate long and short dash line XIIA-XIIA illustrated in FIG. 1B is viewed from the Y2 side as shown by the arrows. FIG. 12B is a cross-sectional view of the cover members and the magnetic members, and illustrates a cross section of the cover members 4 and the magnetic members, where a virtual plane that is parallel to the XZ plane including alternate long and short dash line XIIB-XIIB illustrated in FIG. 1B is viewed from the X1 side as shown by the arrows. Note that, in FIG. 12A and FIG. 12B, illustration of members other than the cover members 4 and the magnetic members is omitted for clarification. Also, in FIG. 12A and FIG. 12B, for clarification, a cross pattern is imparted to the N pole portion of permanent magnets among the magnetic members, and a dot pattern is imparted to the S pole portion of permanent magnets among the magnetic members.

The magnetic members include a first magnetic member MG1 to a tenth magnetic member MG10. In the following description, the first magnetic member MG1 to the tenth magnetic member MG10 may be referred to simply as magnetic members MG for ease of explanation. Also, the first magnetic member MG1 to the fourth magnetic member MG4 and the seventh magnetic member MG7 to the tenth magnetic member MG10 may be referred to as movable magnetic members. The fifth magnetic member MG5 and the sixth magnetic member MG6 may be referred to as fixed magnetic members.

As illustrated in FIG. 5B, the first magnetic member MG1 and the second magnetic member MG2 are magnetic members provided in the first swing member 2 (the lower holder 2D). In FIG. 5B, a coarse dot pattern is imparted to magnetic members (the first magnetic member MG1, the second magnetic member MG2, the seventh magnetic member MG7, and the eighth magnetic member MG8) for clarification. To be more specific, referring to FIG. 5B, the first magnetic member MG1 is fitted in the recessed part formed in the middle portion of the lower surface of the left wall part 2WL of the lower holder 2D, and fixed therein with an adhesive. Similarly, the second magnetic member MG2 is fitted in the recessed part formed in the middle portion of the lower surface of the right wall part 2WR of the lower holder 2D, and fixed therein with an adhesive.

As illustrated in FIG. 6A(c), the third magnetic member MG3 and the fourth magnetic member MG4 are magnetic members provided in the second swing member 7. In FIG. 6A(c), a coarse dot pattern is imparted to the third magnetic member MG3 and the fourth magnetic member MG4 for clarification. To be more specific, referring to FIG. 6A(c), the third magnetic member MG3 is fitted in the recessed part formed in the middle portion of the upper surface of the left wall part 7WL of the second swing member 7, and fixed therein with an adhesive. Similarly, the fourth magnetic member MG4 is fitted in the recessed part formed in the middle portion of the upper surface of the right wall part 7WR of the second swing member 7, and fixed therein with an adhesive.

The fifth magnetic member MG5 and the sixth magnetic member MG6 are members that constitute the fixed member FB. In this embodiment, the fifth magnetic member MG5 is the lower cover member 4D, and the sixth magnetic member MG6 is the upper cover member 4U. However, the fifth magnetic member MG5 may be another member that is attached to the lower cover member 4D. Also, the sixth magnetic member MG6 may be another member that is attached to the upper cover member 4U.

As illustrated in FIG. 5B, the seventh magnetic member MG7 and the eighth magnetic member MG8 are magnetic members provided in the first swing member 2 (the lower holder 2D). To be more specific, referring to FIG. 5B, the seventh magnetic member MG7 is fitted in the recessed part formed in the middle portion of the lower surface of the front wall part 2WF of the lower holder 2D, and fixed therein with an adhesive. Similarly, the eighth magnetic member MG8 is fitted in the recessed part formed in the middle portion of the lower surface of the rear wall part 2WB of the lower holder 2D, and fixed therein with an adhesive.

As illustrated in FIG. 6B, the ninth magnetic member MG9 and the tenth magnetic member MG10 are magnetic members provided in the second swing member 7. In FIG. 6B, a coarse dot pattern is imparted to the ninth magnetic member MG9 and the tenth magnetic member MG10 for clarification. To be more specific, referring to FIG. 6B, the nine magnetic member MG9 is fitted in the recessed part formed in the middle portion of the lower surface of the front wall part 7WF of the second swing member 7, and fixed therein with an adhesive. Similarly, the tenth magnetic member MG10 is fitted in the recessed part formed in the middle portion of the lower surface of the rear wall part 7WB of the second swing member 7, and fixed therein with an adhesive.

In this embodiment, the movable magnetic members (the first magnetic member MG1 to the fourth magnetic member MG4 and the seventh magnetic member MG7 to the tenth magnetic member MG10) are permanent magnets with two magnetic poles in the Z-axial direction.

In FIG. 12A, the solid line indicates the positions of the magnetic members MG in the event the optical module drive device 101 is in an initial state. Also, the thick broken line indicates the positions of the seventh magnetic member MG7 and the eighth magnetic member MG8 in the event the first swing member 2 swings clockwise about the first swing axis AX1 in right side view. Furthermore, the thin broken line indicates the positions of the seventh magnetic member MG7 and the eighth magnetic member MG8 in the event the first swing member 2 swings counterclockwise about the first swing axis AX1 in right side view. Note that the positions of the ninth magnetic member MG9 and the tenth magnetic member MG10 do not change when the first swing member 2 swings about the first swing axis AX1.

In FIG. 12B, the solid line indicates the position of the magnetic member MG in the event the optical module drive device 101 is in an initial state. Also, the thick broken line indicates the positions of the first magnetic member MG1 to the fourth magnetic member MG4 in the event the second swing member 7 swings clockwise about the second swing axis AX2 in front view. Furthermore, the thin broken line indicates the positions of the first magnetic member MG1 to the fourth magnetic member MG4 in the event the second swing member 7 swings counterclockwise about the second swing axis AX2 in front view.

Now, assisting means for assisting the driving force provided by the drive parts DM for allowing the movable member MB swing about the swing axes AX will be described. First, a first assisting means AM1 for assisting the driving force provided by the first drive part DM1 for allowing the first swing member 2 swing about the first swing axis AX1 will be described.

The swinging state of the first swing member 2 is detected by using the eighth magnetic member MG8 and the rear magnetic sensor 11B. The eighth magnetic member MG8 is attached to the first swing member 2 (the lower holder 2D) as illustrated in FIG. 5B, and the rear magnetic sensor 11B is attached to the tongue part 10T located in the center part of the rear part 10B of the insulating circuit board 10 as illustrated in FIG. 2.

As illustrated in FIG. 12A, the rear magnetic sensor 11B is arranged so as to detect the magnetic field that the eighth magnetic member MG8 creates. To be more specific, the rear magnetic sensor 11B is configured to output higher voltage values when the N pole portion of the eighth magnetic member MG8 is nearer, that is, the more the first swing member 2 swings clockwise about the first swing axis AX1 in right side view. Also, the rear magnetic sensor 11B is configured to output lower voltage values when the S pole portion of the eighth magnetic member MG8 is nearer, that is, the more the first swing member 2 swings counterclockwise about the first swing axis AX1 in right side view. Consequently, the control device can detect the swinging state of the first swing member 2 based on the magnitude of voltage values that the rear magnetic sensor 11B outputs.

As illustrated in FIG. 12A, the seventh magnetic member MG7 and the ninth magnetic member MG9 are arranged such that, the more the first swing member 2 swings clockwise about the first swing axis AX1 in right side view, the greater the magnetic attraction force (hereinafter referred to as "the first attraction force") that acts between the seventh magnetic member MG7 and the ninth magnetic member MG9.

Note that the driving force provided by the first drive part DM1 for allowing the first swing member 2 to swing clockwise tends to be smaller the more the first swing member 2 swings clockwise. This is because the first drive part DM1 is constituted by the first shape memory alloy wires 9A, and the lower the contraction rate of the first shape memory alloy wires 9A becomes, the more the first shape memory alloy wires 9A shrink. Note that the contraction rate is, for example, the amount that indicates how much the first shape memory alloy wires 9A shrink when a predetermined rise in temperature occurs. Therefore, the first attraction force acts to compensate for the decrease in the driving force provided by the first drive part DM1. To be more specific, the seventh magnetic member MG7 and the ninth magnetic member MG9 are arranged such that the more the first swing member 2 swings clockwise about the first swing axis AX1 in right side view, the shorter the distance between the N pole portion of the seventh magnetic member MG7 and the S pole portion of the ninth magnetic member MG9 becomes.

On the other hand, as illustrated in FIG. 12A, the eighth magnetic member MG8 and the tenth magnetic member MG10 are arranged such that the more the first swing member 2 swings counterclockwise about the first swing axis AX1 in right side view, the greater the magnetic attraction force (hereinafter referred to as "the second attraction force") that acts between the eighth magnetic member MG8 and the tenth magnetic member MG10.

Note that the driving force provided by the first drive part DM1 for allowing the first swing member 2 to swing counterclockwise tends to be smaller the more the first swing member 2 swings counterclockwise, similar to the driving force provided by the first drive part DM1 for allowing the first swing member 2 to swing clockwise. Therefore, the second attraction force acts to compensate for the decrease in the driving force provided by the first drive part DM1. To be more specific, the eighth magnetic member MG8 and tenth magnetic member MG10 are arranged such that the more the first swing member 2 swings counterclockwise about the first swing axis AX1 in right side view, the shorter the distance between the N pole portion of the eighth magnetic member MG8 and the S pole portion of the tenth magnetic member MG10 becomes.

As described above, the seventh magnetic member MG7 to the tenth magnetic member MG10 function as the first assisting means AM1 that assists the driving force provided by the first drive part DM1 for allowing the first swing member 2 to swing about the first swing axis AX1.

Next, a second assisting means AM2 that assists the driving force produced by the second drive part DM2 for allowing the second swing member 7 to swing about the second swing axis AX2 will be described.

The swinging state of the second swing member 7 is detected by using the first magnetic member MG1 and the second magnetic member MG2, which are attached to the first swing member 2 (the lower holder 2D) as illustrated in FIG. 5B, and the left magnetic sensor 11L and the right magnetic sensor 11R, which are attached to the insulating circuit board 10 as illustrated in FIG. 2.

As illustrated in FIG. 12B, the left magnetic sensor 11L is arranged so as to detect the magnetic field the first magnetic member MG1 creates. To be more specific, the left magnetic sensor 11L is configured to output lower voltage values when the S pole portion of the first magnetic member MG1 is nearer, that is, the more the second swing member 7 swings counterclockwise about the second swing axis AX1 in front view. As illustrated in FIG. 12B, the right magnetic sensor 11R is arranged so as to detect the magnetic field the second magnetic member MG2 creates. To be more specific, the right magnetic sensor 11R is configured to output lower voltage values when the S pole portion of the second magnetic member MG2 is nearer, that is, the more the second swing member 7 swings counterclockwise about the second swing axis AX1 in front view. Therefore, the control device can detect the swinging state of the second swing member 7 based on the magnitude of voltage values that the left magnetic sensor 11L and the right magnetic sensor 11R output individually.

As illustrated in FIG. 12B, the first magnetic member MG1 and the fifth magnetic member MG5 (the lower cover member 4D) are arranged such that the more the second swing member 7 swings counterclockwise about the second swing axis AX2 in front view, the greater the magnetic attraction force (hereinafter referred to as "the third attraction force") that acts between the first magnetic member MG1 and the fifth magnetic member MG5 (the lower cover member 4D). To be more specific, the first magnetic member MG1 and the fifth magnetic member MG5 (the lower cover member 4D) are arranged such that the more the second swing member 7 swings counterclockwise about the second swing axis AX2 in front view, the shorter the distance between the first magnetic member MG1 and the fifth magnetic member MG5 (the lower cover member 4D) becomes.

The fourth magnetic member MG4 and the sixth magnetic member MG6 (the upper cover member 4U) are arranged such that, as illustrated in FIG. 12B, the more the second swing member 7 swings counterclockwise about the second swing axis AX2 in front view, the greater the magnetic attraction force (hereinafter referred to as "the fourth attraction force") that acts between the fourth magnetic member MG4 and the sixth magnetic member MG6 (the upper cover member 4U). To be more specific, the fourth magnetic member MG4 and the sixth magnetic member MG6 (the upper cover member 4U) are arranged such that the more the second swing member 7 swings counterclockwise about the second swing axis AX2 in front view, the shorter the distance between the fourth magnetic member MG4 and the sixth magnetic member MG6 (the upper cover member 4U) becomes.

Note that the driving force provided by the second drive part DM2 for allowing the second swing member 7 to swing counterclockwise tends to be smaller the more the second swing member 7 swings counterclockwise. This is because the second drive part DM1 is constituted by the second shape memory alloy wires 9B, and the lower the contraction rate of the second shape memory alloy wires 9B becomes, the more the second shape memory alloy wires 9B shrink. Therefore, the third attraction force and the fourth attraction force act to compensate for the decrease of the driving force provided by the second drive part DM2.

The second magnetic member MG2 and the fifth magnetic member MG5 (the lower cover member 4D) are arranged such that, as illustrated in FIG. 12B, the more the second swing member 7 swings clockwise about the second swing axis AX2 in front view, the greater the magnetic attraction force (hereinafter referred to as "the fifth attraction force") that acts between the second magnetic member MG2 and the fifth magnetic member MG5 (the lower cover member 4D). To be more specific, the second magnetic member MG2 and the fifth magnetic member MG6 (the lower cover member 4U) are arranged such that the more the second swing member 7 swings counterclockwise about the second swing axis AX2 in front view, the shorter the distance between the second magnetic member MG2 and the fifth magnetic member MG5 (the lower cover member 4D) becomes.

The third magnetic member MG3 and the sixth magnetic member MG6 (the upper cover member 4U) are arranged such that, as illustrated in FIG. 12B, the more the second swing member 7 swings clockwise about the second swing axis AX2 in front view, the greater the magnetic force (hereinafter referred to as "the sixth magnetic force") that acts between the third magnetic member MG3 and the sixth magnetic member MG6 (the upper cover member 4U). To be more specific, the third magnetic member MG3 and the sixth magnetic member MG6 (the upper cover member 4U) are arranged such that the more the second swing member 7 swings clockwise about the second swing axis AX2 in front view, the shorter the distance between the third magnetic member MG3 and the sixth magnetic member MG6 (the upper cover member 4U) becomes.

Note that the driving force provided by the second drive part DM2 for allowing the second swing member 7 to swing clockwise tends to be smaller the more the second swing member 7 swings clockwise, similar to the driving force that is provided by the second drive part DM2 for allowing the second swing member 7 to swing counterclockwise. Therefore, the fifth attraction force and the sixth attraction force act to compensate for the decrease of the driving force provided by the second drive part DM2.

In this way, the first magnetic member MG1 to the sixth magnetic member MG6 function as a second assisting means AM2 that assists the driving force provided by the second drive part DM2 for allowing the second swing member 7 to swing about the axis AX2. Note that, in the following description, the first assisting means AM1 and the second assisting means AM2 may be referred to simply as assisting means AM for ease of explanation.

As described above, as illustrated in FIG. 1A, FIG. 1B, FIG. 2 and FIG. 3, the optical module drive device 101 according to the above embodiment of the present invention includes: a first swing member 2 configured to hold an optical module (camera module CM) having a lens body LS and an image sensor IS; a second swing member 7 connected to the first swing member 2 such that the first swing member 2 is swingable about a first axial line (the first swing axis AX1) that intersects an optical axis direction; a fixed member FB (base member 8) connected to the second swing member 7 such that the second swing member 7 is swingable about a second axial line (the second swing axis AX2) that intersects the optical axis direction and is perpendicular to the axial direction of the first axial line (the first swing axis AX1); and a drive part configured to make the first swing member 2 swing relative to the fixed member FB such that an optical axis OA of the lens body LS tilts. The drive part DM includes a plurality of shape memory alloy wires 9 provided between movable members MB including the first swing member 2 and the second swing member 7, and the fixed member FB.

This configuration does not require magnets and coils unlike configurations that employ the voice coil motor system so that it is possible to reduce an increase in size compared to configurations that employ the voice coil motor system.

As illustrated in FIG. 3, the drive part DM may have a plurality of first shape memory alloy wires 9A (the first inner wire 9A1 to the fourth inner wire 9A4) provided between the first swing member 2 and the second swing member 7. Also, the shape memory alloy wires 9 provided between the movable member MB and the fixed member FB may be, as illustrated in FIG. 3, constituted by a plurality of second shape memory alloy wires 9B (the first outer wire 9B1 to the fourth outer wire 9B4) provided between the second swing member 7 and the fixed member FB (the base member 8).

As illustrated in FIG. 3, the first shape memory alloy wires 9A may be arranged at two locations that are spaced apart in the axial direction of the second axial line (the second swing axis AX2) with the first swing member 2 in between. Also, as illustrated in FIG. 3, the second shape memory alloy wires 9B may be arranged at two locations that are spaced apart in the axial direction of the first axial line (the first swing axis AX1) with the first swing member 2 in between.

With this configuration, the second swing member 7 connected to the first swing member 2 is supported in a well-balanced manner by, for example, the shape memory alloy wires 9, at each of front, rear, left, and right locations relative to the first swing member 2. Therefore, this configuration brings about the effect of stabilizing the swing of the first swing member 2 (the lens body LS).

Two first shape memory alloy wires 9A may be arranged at each of the two locations spaced apart in the axial direction of the second axial line (the second swing axis AX2). Furthermore, these two first shape memory alloy wires 9A may intersect each other when viewed in the axial direction of the second axial line (the second swing axis AX2) and form a first wire pair. In the example illustrated in FIG. 3, the first inner wire 9A1 and the second inner wire 9A2 form a first front wire pair as a first wire pair, and the third inner wire 9A3 and the fourth inner wire 9A4 form a first rear wire pair as a first wire pair.

Also, two second shape memory alloy wires 9B may be arranged at each of the two locations spaced apart in the axial direction of the first axial line (the first swing axis AX1). Furthermore, these two second shape memory alloy wires 9B may intersect each other when viewed in the axial direction of the first axial line (the first swing axis AX1) and form a second wire pair. In the example illustrated in FIG. 3, the first outer wire 9B1 and the second outer wire 9B2 form a second left wire pair as a second wire pair, and the third outer wire 9B3 and the fourth outer wire 9B4 form a second right wire pair as a second wire pair.

This configuration makes the first swing member 2 (the lens body LS) swing by using a pair of shape memory alloy wires 9. This brings about the effect of further stabilizing the swing of the first swing member 2 (the lens body LS) compared to the case where the first swing member 2 (the lens body LS) is swung by using one shape memory alloy wire 9. Also, in this configuration, two shape memory alloy wires 9 are placed diagonally to each other, so that the length of the shape memory alloy wires 9 can be increased compared to the case where these shape memory alloy wires 9 are arranged in parallel with each other in the vertical direction (the Z-axial direction). Therefore, as long as the shape memory alloy wires 9 have the same contraction rate, this configuration can increase the amount of swing of the first swing member 2 (the lens body LS) compared to the case where two shape memory alloy wires 9 are arranged in parallel with each other in the vertical direction (the Z-axial direction).

Desirably, the two first shape memory alloy wires 9A forming the first wire pair each have one end part electrically connected mutually between the two first shape memory alloy wires 9A, and/or the two second shape memory alloy wires 9B forming the second wire pair each have one end part electrically connected mutually between the two second shape memory alloy wires 9B. In the example illustrated in FIG. 3, the first inner wire 9A1 and the second inner wire 9A2 forming the first front wire pair are connected in series, the third inner wire 9A3 and the fourth inner wire 9A4 forming the first rear wire pair are connected in series, the first outer wire 9B1 and the second outer wire 9B2 forming the second left wire pair are connected in series, and the third outer wire 9B3 and the fourth outer wire 9B4 forming the second right wire pair are connected in series.

Given this configuration, it becomes easy to form conductive paths for electrically connecting the two first shape memory alloy wires 9A forming the first wire pair. Also, it becomes easy to form conductive paths for electrically connecting the two second shape memory alloy wires 9B forming the second wire pair. Furthermore, in the event two shape memory alloy wires 9 forming a wire pair are connected in series, the same electric current may flow in these two series-connected shape memory alloy wires 9, which then brings about the effect of reducing the difference in the amount of contraction arising between the two shape memory alloy wires 9 when electrically connected.

The first swing member 2 may have a first metal member 5A that is configured to electrically connect, mutually, one end part of each of the two first shape memory alloy wires 9A forming the first wire pair between the two first shape memory alloy wires 9A. In this case, one end part of each of the two first shape memory alloy wires 9A is fixed to the first metal member 5A. In the example illustrated in FIG. 3, a first front metal member 5AF, which connects the first inner wire 9A1 and the second inner wire 9A2 forming the first front wire pair in series, and a first rear metal member 5AB, which connects the third inner wire 9A3 and the fourth inner wire 9A4 forming the first rear wire pair in series are attached to the first swing member 2. Furthermore, one end part (the lower end part) of each of the first inner wire 9A1 and the second inner wire 9A2 is fixed to the first front metal member 5AF, and one end part (the lower end part) of each of the third inner wire 9A3 and the fourth inner wire 9A4 is fixed to the first rear metal member 5AB.

With this configuration, it is not necessary to provide, in the first swing member 2, conductive paths for applying electric current from the outside to the first shape memory alloy wires 9A. Therefore, with this configuration, it is not necessary to embed conductive members in the first swing member 2 by using insert molding or the like. Consequently, this configuration brings about the effect of simplifying the structure of the first swing member 2.

The second swing member 7 may have a second metal member 5B, to which the other end part of one of the two first shape memory alloy wires 9A is fixed, and, a third metal member 5C, to which the other end part of the other one of the two first shape memory alloy wires 9A is fixed. In this case, the first metal member 5A, the second metal member 5B, and the third metal member 5C may have respective flat parts that are arranged substantially in parallel with each other. In the example illustrated in FIG. 3, a second front metal member 5BF, to which the other end part (the upper end part) of the first inner wire 9A1 is fixed, and a third front metal member 5CF, to which the other end part (the upper end part) of the second inner wire 9A2 is fixed, are attached to the second swing member 7. Furthermore, as illustrated in FIG. 4B, a flat part PT1 of the first front metal member 5AF, a flat part PT2 of the second front metal member 5BF, and a flat part PT3 of the third front metal member 5CF are arranged substantially in parallel with each other with a gap GP in between. Note that the flat part PT2 and the flat part PT3 are located substantially on the same plane, so that that flat part PT2 cannot be seen in FIG. 4B. Consequently, in FIG. 4B, the line drawn to indicate the location of the flat part PT2 is shown as a broken line.

In this configuration, the first front metal member 5AF, the second front metal member 5BF, and the third front metal member 5CF are formed from the same one metal member (metal plate) by using, for example, sheet metal processing. Furthermore, the first front metal member 5AF, the second front metal member 5BF, and the third front metal member 5CF can be provided as a module, to which the first inner wire 9A1 and the second inner wire 9A2 are attached, as illustrated in FIG. 4. Therefore, this configuration brings about the effect of making it easy to assemble the first front metal member 5AF, the second front metal member 5BF, and the third front metal member 5CF into the second swing member 7.

As illustrated in FIG. 6A, a first conductive member (the first inner conductive member 15A) and a second conductive member (the second inner conductive member 15B) made of metal may be embedded in the second swing member 7. Also, as shown in FIG. 8B, a first leaf spring member (the first leaf spring 6A) and a second leaf spring member (the second leaf spring 6B) made of metal may be provided between the second swing member 7 and the fixed member FB (the base member 8). Furthermore, as illustrated in FIG. 6A, the first conductive member (the first inner conductive member 15A) may have a first connecting part (the side surface connecting part 15sA) and a second connecting part (the upper surface connecting part 15pA) that are exposed from the second swing member 7. Also, as illustrated in FIG. 6A, the second conductive member (the second inner conductive member 15B) may have a third connecting part (the side surface connecting part 15sB) and a fourth connecting part (the upper surface connecting part 15pB) that are exposed from the second swing member 7. In this case, the first connecting part (the side surface connecting part 15sA) may be connected to a second metal member 5B (the second front metal member 5BF), and the third connecting part (the side surface connecting part 15sB) may be connected to a third metal member 5C (the third front metal member 5CF). Also, as illustrated in FIG. 8A, the second connecting part (the upper surface connecting part 15pA) may be connected to a first leaf spring 6A, and the fourth connecting part (the upper surface connecting part 15pB) may be connected to a second leaf spring 6B.

This configuration brings about the effect of providing conductive paths for providing electric current from the outside to the first shape memory alloy wires 9A with a simple configuration.

The second swing member 7 may have a fourth metal member 5D that is configured to electrically connect, mutually, one end part of each of the two second shape memory alloy wires 9B forming the second wire pair between the two second shape memory alloy wires 9B. Furthermore, one end part of each of the two second shape memory alloy wires 9B may be fixed to the fourth metal member 5D. In the example illustrated in FIG. 3, a fourth left metal member 5DL, which connects the first outer wire 9B1 and the second outer wire 9B2 forming a second left wire pair as a second wire pair in series, and a fourth right metal member 5DR, which connects the third outer wire 9B3 and the fourth outer wire 9B4 forming a second right wire pair as a second wire pair in series, are attached to the second swing member 7. Furthermore, one end part (the upper end part) of each of the first outer wire 9B1 and the second outer wire 9B2 is fixed to the fourth left metal member 5DL, and one end part (the upper end part) of each of the third outer wire 9B3 and the fourth outer wire 9B4 is fixed to the fourth right metal member 5DR.

With this configuration, the first front metal member 5AF for connecting the first front wire pair in series and the first rear metal member 5AB for connecting the first rear wire pair in series are provided in the first side wire member 2. Furthermore, the fourth left metal member 5DL for connecting the second left wire pair in series and the fourth right metal member 5DR for connecting the second right wire pair in series are provided in the second swing member 7. Therefore, this configuration brings about the effect of making it easy to secure conductive paths for electrically connecting the shape memory alloy wires 9.

The first swing member 2 and the second swing member 7 may be configured such that a first axis part provided in one of the first swing member 2 and the second swing member 7 and a first receiving part provided in the other one of the first swing member 2 and the second swing member 7 to receive the first axis part enable the first swing member 2 to swing about the first axial line (the first swing axis AX1) relative to the second swing member 7. In the example illustrated in FIG. 10, the first swing member 2 (the lower holder 2D) and the second swing member 7 are configured such that a pair of axis parts 2X (the left axis part 2XL (see FIG. 5B) and the right axis part 2XR), which are provided in the lower holder 2D as a first axis part, and a pair of receiving parts 7S (the left receiving part 7SL (see FIG. 6A(c)) and the right receiving part 7SR), which are provided in the second swing member 7 as a first receiving part to receive the pair of axis parts 2X, allow the lower holder 2D to swing about the first axial line (the first swing axis AX1) relative to the second swing member 7.

Also, the second swing member 7 and the fixed member FB may be configured such that a second axis part provided in one of the second swing member 7 and the fixed member FB and a second receiving part provided in the other one of the second swing member 7 and the fixed member FB to receive the second axis part enable the second swing member 7 to swing about the second axial line (the second swing axis AX2) relative to the fixed member FB. In the example illustrated in FIG. 11, the second swing member 7 and the fixed member FB (the base member 8) are configured such that a pair of axis parts 7X (the front axis part 7XF and the rear axis part 7XB (see FIG. 6B)), which are provided in the second swing member 7 as a second axis part, and a pair of receiving parts 8S (the front receiving part 8SF and rear receiving part 8SB (see FIG. 7(c)), which are provided in the base member 8 as a second receiving part to receive the pair of axis parts 7X enable the second swing member 7 to swing about the second axial line (the second swing axis AX2) relative to the base member 8.

This configuration brings about the effect of providing the swing mechanism SM in a simple structure. To be more specific, the swing mechanism SM includes the first swing mechanism SM1 and the second swing mechanism SM2. Furthermore, the first swing mechanism SM1 is easily implemented by combining a pair of axis parts 2X and a pair of receiving parts 7S. The second swing mechanism SM2 is easily implemented by combining a pair of axis parts 7X and a pair of receiving parts 8S.

The first receiving part may have at least a recessed portion that is open in the optical axis direction. Furthermore, a first preloading member configured to exert a force that causes the first axis part and the first receiving part to press against each other is provided between the first swing member (the lower holder 2D) and the second swing member.

In the example illustrated in FIG. 10, the right receiving part 7SR has a recessed portion that is open in the optical axis direction, that is, a V-groove shape that is recessed upward. The same applies to the left receiving part 7SL (see FIG. 6A(c)). Furthermore, as illustrated in FIG. 8C, leaf springs 6 (the first leaf spring 6A to the fourth leaf spring 6D) are provided between the lower holder 2D and the second swing member 7. The leaf springs 6 function as a first preloading member that exerts a force that causes the right axis part 2XR and the right receiving part 7SR to press against each other, and exerts a force that causes the left axis part 2XL and the left receiving part 7SL to press against each other. In the above-described embodiment, the inner portion 6i, the inner elastic arm part 6g, and the middle portion 6m of the leaf springs 6 function as the first preloading member.

The second receiving part may at least have a recessed portion that is open in the optical axis direction. Furthermore, a second preloading member configured to exert a force that causes the second axis part and the second receiving part to press against each other may be provided between the second swing member 7 and the fixed member FB (the base member 8).

In the example illustrated in FIG. 11, the front receiving part 8SF has a recessed portion that is open in the optical axis direction, that is, a V-groove shape that is recessed downward. The same applies to the rear receiving part 8SB (see FIG. 7(c)). Furthermore, as illustrated in FIG. 8C, leaf springs 6 (the first leaf spring 6A to the fourth leaf spring 6D) are provided between the second swing member 7 and the base member 8. The leaf springs 6 function as a second preloading member that exerts a force that causes the front axis part 7XF and the front receiving part 8SF (see FIG. 8A) to press against each other, and exerts a force that causes the rear axis part 7XB and the rear receiving part 8SB (see FIG. 8A) to press against each other. In the above-described embodiment, the outer portion 6e, the outer elastic arm part 6f, and the middle portion 6m of the leaf springs 6 function as the second preloading member.

This configuration brings about the effect of reducing rattling between the pair of axis parts 2X and the pair of receiving parts 7S, and reducing the occurrence of rattling between the pair of axis parts 7X and the pair of receiving parts 8S.

The optical module drive device 101 may be configured such that a first direction (upward direction) in which the first swing member 2 is preloaded by the first preloading member towards the second swing member 7 (the Z1 side) and a second direction (downward direction) in which the second swing member 7 is preloaded by the second preloading member towards the fixed member FB (the base member 8) (the Z2 side) are opposite to each other.

This configuration is implemented by raising the position of the middle portion 6m of the leaf springs 6 higher than the inner portion 6i and the outer portion 6e of the leaf springs 6. In contrast with configurations in which one of the inner portion 6i and the outer portion 6e of the leaf springs 6 is higher than the position of the middle portion 6m and the other one of the inner portion 6i and the outer portion 6e of the leaf springs 6 is lower than the position of the middle portion 6m, this configuration brings about the effect of reducing the height dimension of the optical module drive device 101.

As illustrated in FIG. 5A and FIG. 5B, the first swing member 2 may have a first frame-like part (the frame-like part 2F) and a first axis part (the left axis part 2XL and the right axis part 2XR). The first axis part is constituted by two protruding portions that protrude outward from each of two opposing side wall parts (the left wall part 2WL and the right wall part 2WR) of the first frame-like part (the frame-like part 2F). Also, as illustrated in FIG. 6A, the second swing member 7 may have a second frame-like part (the frame-like part 7F) and a first receiving part (the left receiving part 7SL and the right receiving part 7SR). The second frame-like part (the frame-like part 7F) is located on the outer side of the first frame-like part (the frame-like part 2F). The first receiving part (the left receiving part 7SL and the right receiving part 7SR) is constituted by two recessed portions formed in the lower end part of each of the two opposing side wall parts (the left wall part 7WL and the right wall part 7WR) of the second frame-like part (the frame-like part 7F). Furthermore, the first receiving part (the left receiving part 7SL and the right receiving part 7SR) may be arranged above (on the subject side relative to) the first axis part (the left axis part 2XL and the right axis part 2XR). This configuration brings about the effect of implementing the first swing mechanism SM1 in a simple structure.

The first preloading member and the second preloading member may be constituted by the same leaf spring member (leaf spring 6). In the above-described embodiment, the first preloading member is implemented with the inner portion 6i, the inner elastic arm part 6g, and the middle portion 6m of the leaf spring 6, and the second preloading member is implemented with the middle portion 6m, the outer elastic arm part 6f, and the outer portion 6e of the leaf spring 6.

In this configuration, the leaf springs 6 are configured to function as the first preloading member and also as the second preloading member. Therefore, this configuration brings about the effect of reducing the number of parts. Also, this configuration brings about the effect of simplifying the assembly of the optical module drive device 101. However, the first preloading member and the second preloading member may as well be implemented by using separate members.

The leaf spring 6 may have a first fixed part (inner portion 6i) that is fixed to the swing member 2, a second fixed part (middle portion 6m) that is fixed to the second swing member 7, a third fixed part (outer portion 6e) fixed to the fixed member FB (the base member 8), a first elastic arm part (inner elastic arm part 6g) provided between the first fixed part (inner portion 6i) and the second fixed part (middle portion 6m), and a second elastic arm part (outer elastic arm part 6f) provided between the second fixed part (middle portion 6m) and the third fixed part (outer portion 6e). In this case, the first fixed part (the inner portion 6i) may be fixed to the first swing member 2 in the vicinity of the first axial line (the first swing axis AX1). This means that, for example, the positions of the part where the inner portion 6i and the inner elastic arm part 6g are connected is within a first predetermined distance range from the first swing axis AX1 in top view in the optical axis direction. Furthermore, the first predetermined distance is preferably a distance smaller than the first distance between the first swing axis AX1 and the front wall part 2WF of the first swing member 2, more preferably a distance less than half of the first distance, and most preferably a distance smaller than a quarter of the first distance. Also, the second fixed part (middle portion 6m) may be fixed to the second swing member 7 in the vicinity of the second axial line (the second swing axis AX2). This means that, for example, the position of the part where the center portion 6m and the outer elastic arm part 6f are connected is within a second predetermined distance range from the second swing axis AX2 in top view in the optical axis direction. Furthermore, the first predetermined distance is preferably a distance smaller than the first distance between the first swing axis AX1 and the front wall part 2WF of the first swing member 2, more preferably a distance less than half of the second distance, and most preferably a distance smaller than a quarter of the second distance.

This configuration brings about the effect of reducing the force (torque) to be received from the leaf springs 6 when the movable members MB swing.

Also, in the optical module drive device 101 according to the embodiment of the present invention, the drive part DM may have the first drive parts DM1, which makes the first swing member 2 swing about the first axial line (the first swing axis AX1), and a second drive part DM2, which makes the second swing member 7 swing about the second axial line (the second swing axis AX2). In this case, the optical module drive device 101 may include an assisting means AM that assists the drive of at least one of the first drive part DM1 and the second drive part DM2.

This configuration brings about the effect of making the movable members MB swing reliably by means of the assisting means AM even when the swing angle is large.

The assisting means AM preferably has a first magnetic member MG1 and a second magnetic member MG2 provided in one of the first swing member 2 and the second swing member 7, and a fixed magnetic member provided in the fixed member FB. In this case, the first magnetic member MG1 and the second magnetic member MG2 are arranged so as to face each other with the second axial line (the second swing axis AX2) in between, in top view in the optical axis direction. Furthermore, the first magnetic member MG1 is arranged such that, when the second swing member 7 swings in one direction about the second axial line (the second swing axis AX2), the magnetic attraction force that acts between the first magnetic member MG1 and the fixed magnetic member increases. Also, the second magnetic member MG2 is arranged such that, when the second swing member 7 swings in the other direction about the second axial line (the second swing axis AX2), the magnetic attraction force that acts between the second magnetic member MG2 and the fixed magnetic member increases.

In the embodiment described above, the assisting means AM has the first magnetic member MG1 and the second magnetic member MG2, provided in the first swing member 2 (the lower holder 2D) as illustrated in FIG. 5B, and a cover member 4 that serves as a fixed magnetic member. The first magnetic member MG1 and the second magnetic member MG2 are arranged to face each other with the second axial line (the second swing axis AX2) in between, in top view in the optical axis direction. Furthermore, the first magnetic member MG1 is arranged such that, as illustrated in FIG. 12B, when the first swing member 2 and the second swing member 7 swing counterclockwise about the second swing axis AX2 in front view, the magnetic attraction force that acts between the first magnetic member MG1 and the fixed magnetic member (the lower cover member 4D) increases. Also, the second magnetic member MG2 is arranged such that when the first swing member 2 and the second swing member 7 swing clockwise about the second swing axis AX2 in front view, the magnetic attraction force that acts between the second magnetic member MG2 and the fixed magnetic member (the lower cover member 4D) increases.

This configuration brings about the effect of making the second swing member 7 swing reliably about the second axial line (the second swing axis AX2), by using the magnetic attraction force that acts between the magnetic members MG, even when the swing angle is large.

The assisting means AM preferably has the first magnetic member MG1 and the second magnetic member MG2 provided in the first swing member 2, a third magnetic member MG3 and a fourth magnetic member MG4 provided in the second swing member 7, and a fifth magnetic member MG5 and a sixth magnetic member MG6 provided in the fixed member FB (the cover member 4).

In this case, the third magnetic member MG3 and the fourth magnetic member MG4 are arranged so as to face each other with the second axial line (the second swing axis AX2) in between, in top view in the optical axis direction. Furthermore, the first magnetic member MG1 is arranged such that, when the second swing member 7 swings in one direction about the second axial line (the second swing axis AX2), the magnetic attraction force that acts between the first magnetic member MG1 and the fifth magnetic member MG5 increases, and the fourth magnetic member MG4 is arranged such that the magnetic attraction force that acts between the fourth magnetic member MG4 and the sixth magnetic member MG6 increases.

When the second swing member 7 swings in the other direction about the second axial line (the second swing axis AX2), the second magnetic member MG2 is arranged such that the magnetic attraction force that acts between the second magnetic member MG2 and the fifth magnetic member MG5 increases, and the third magnetic member MG3 is arranged such that the magnetic attraction force that acts between the third magnetic member MG3 and the sixth magnetic member MG6 increases.

In the embodiment described above, the assisting means AM has the first magnetic member MG1 and the second magnetic member MG2 provided in the first swing member 2 (the lower holder 2D) as illustrated in FIG. 5B, the third magnetic member MG3 and the fourth magnetic member MG4 provided in the second swing member 7 as illustrated in FIG. 6A, the lower cover member 4D as the fifth magnetic member MG5, and the upper cover member 4U as the sixth magnetic member MG6 as illustrated in FIG. 12B. The third magnetic member MG3 and the fourth magnetic member MG4 are arranged so as to face each other with the second axial line (the second swing axis AX2) in between, in top view in the optical axis direction. Furthermore, the first magnetic member MG1 is arranged such that, as illustrated in FIG. 12B, when the first swing member 2 and the second swing member 7 swing counterclockwise about the second swing axis AX2 in front view, the magnetic attraction force that acts between the first magnetic member MG1 and the fifth magnetic member MG5 (the lower cover member 4D) increases, and the fourth magnetic member MG4 is arranged such that the magnetic attraction force that acts between the fourth magnetic member MG4 and the sixth magnetic member MG6 (the upper cover member 4U) increases. Also, the second magnetic member MG2 is arranged such that, when the first swing member 2 and the second swing member 7 swing clockwise about the second swing axis AX2 in front view, the magnetic attraction force that acts between the second magnetic member MG2 and the fifth magnetic member MG5 increases, and the third magnetic member MG3 is arranged such that the magnetic attraction force that acts between the third magnetic member MG3 and the sixth magnetic member MG6 increases.

This configuration brings about the effect of allowing the second swing member 7 to swing reliably about the second axial line (the second swing axis AX2), by using the magnetic attraction force that acts between the magnetic members MG, even when the swing angle is large.

The movable magnetic members, namely the first magnetic member MG1, the second magnetic member MG2, the third magnetic member MG3, and the fourth magnetic member MG4 may be constituted by magnets.

This configuration brings about the effect of assisting the swing of the swing member 7 about the second axial line (the second swing axis AX2) without providing magnets in the fixed member FB, that is, without employing magnets as fixed magnetic members (fifth magnetic member MG5 and sixth magnetic member MG6).

The fixed member FB may include a housing HS in which the first swing member 2 and the second swing member 7 are arranged. In this case, at least one of the fifth magnetic member MG5 and the sixth magnetic member MG6 may be constituted by the housing HS. That is, for example, at least one of the fifth magnetic member MG5 and the sixth magnetic member MG6 may be part of the housing HS.

This configuration brings about the effect of reducing the number of parts by making the member that constitutes the housing HS and the member that constitutes the fixed magnetic member the same member.

The first swing member 2 and the second swing member 7 may be configured such that the first axis part provided in one of the first swing member 2 and the second swing member 7 and the first receiving part provided in the other one enable the first swing member 2 to swing about the first axial line (the first swing axis AX1) relative to the second swing member 7.

In the examples illustrated in FIG. 5A, FIG. 5B, FIG. 6A, and FIG. 6B, the first swing member 2 and the second swing member 7 are configured such that a pair of axis parts 2X (the left axis part 2XL and the right axis part 2XR) that are provided in the first swing member 2 as the first axis part and a pair of receiving parts 7S (the left receiving part 7SL and the right receiving part 7SR) that are provided in the second swing member 7 as the first receiving part to receive the pair of axis parts 2X enable the first swing member 2 to swing about the first axial line (the first swing axis AX1) relative to the second swing member 7.

In this case, the first magnetic member MG1 and the third magnetic member MG3 are arranged so as to face each other with the left axis part 2XL in between, as shown by the broken line of FIG. 8C. A magnetic force that attracts each other acts between the first magnetic member MG1 and the third magnetic member MG3. In the example illustrated in FIG. 12B, the first magnetic member MG1 and the third magnetic member MG3 are arranged such that the N-pole portion of the first magnetic member MG1 and the S-pole portion of the third magnetic member MG3 face each other with a synthetic resin in between.

Also, as shown by the broken line in FIG. 10($a$), the second magnetic member MG2 and the fourth magnetic member MG4 are arranged so as to face each other with the right axis part 2XR in between. A magnetic force that attracts each other acts between the second magnetic member MG2 and the fourth magnetic member MG4. In the example illustrated in FIG. 12B, the second magnetic member MG2 and the fourth magnetic member MG4 are arranged such that the N-pole portion of the second magnetic member MG2 and the S-pole portion of the fourth magnetic member MG4 face each other with a synthetic resin in between.

Furthermore, leaf springs 6 (the first leaf spring 6A to the fourth leaf spring 6D) may be provided between the first swing member 2 and the second swing member 7. The leaf springs 6 functions as a first preloading member that exerts a force (preloading force) that causes a pair of axis parts 2X (the left axis part 2XL and the right axis part 2XR) provided as the first axis part and a pair of receiving parts 7S (the left receiving part 7SL and the right receiving part 7SR) provided as the first receiving parts to press against each other. In the above-described embodiment, the inner portion 6$i$ the inner elastic arm part 6$g$, and the middle portion 6$m$ of the leaf springs 6 function as the first preloading member.

Even when the preloading force of the first preloading member is not very strong, the above configuration brings about the effect of compensating for the preloading force with the magnetic force that acts between the magnetic members MG. As illustrated in FIG. 12A and FIG. 12B, the magnetic force that acts between magnetic members MG refers to the magnetic force that acts between the first magnetic member MG1 and the third magnetic member MG3, between the second magnetic member MG2 and the fourth magnetic member MG4, between the seventh magnetic member MG7 and the ninth magnetic member MG9, and between eighth magnetic member MG8 and tenth magnetic member MG10.

The fixed member FB may be provided with first magnetic sensors. In this case, the first magnetic sensors may include magnetic sensors located at locations facing the first magnetic member MG1 or the third magnetic member MG3 in the optical axis direction, and magnetic sensors located at locations facing the second magnetic member MG2 or the fourth magnetic member MG4 in the optical axis direction.

In the example illustrated in FIG. 2, first magnetic sensors (a left magnetic sensor 11L and a right magnetic sensor 11R) are provided in the insulating circuit board 10 provided as the fixed member FB. As illustrated in FIG. 12B, the first magnetic sensors include a left magnetic sensor 11L located at a location facing the first magnetic member MG1 in the optical axis direction, and a right magnetic sensor 11R located at a location facing the second magnetic member MG2 in the optical axis direction.

In this configuration, the first magnetic sensor can detect the amount of swing of the second swing member 7 about the second swing axis AX2 by using the magnetic fields generated from the first magnetic member MG1 and the second magnetic member MG2.

The assisting means AM may have a seventh magnetic member MG7 and an eighth magnetic member MG8. In this case, the seventh magnetic member MG7 and the eighth magnetic member MG8 are provided in the portion of the first swing member 2 that is located on the second axial line (the second swing axis AX2) in top view in the optical axis direction, as illustrated in FIG. 5B. Also, the assisting means AM may have a ninth magnetic member MG9 and a tenth magnetic member MG10. In this case, the ninth magnetic member MG9 and the tenth magnetic member MG10 are provided in the portion of the second swing member 7 that is located on the second axial line (the second swing axis AX2). In the top view in the optical axis direction, as illustrated in FIG. 6B.

In this case, at least one of the seventh magnetic member MG7 and the ninth magnetic member MG9 is a magnet. Also, at least one of the eighth magnetic member MG8 and the tenth magnetic member MG10 is a magnet.

Furthermore, the seventh magnetic member MG7 and the ninth magnetic member MG9 are arranged such that, when the first swing member 2 swings in one direction about the first axial line (the first swing axis AX1), the magnetic attraction force that acts between the seventh magnetic member MG7 and the second magnetic member MG9 increases. For example, the seventh magnetic member MG7 and the ninth magnetic member MG9 are arranged such that, as illustrated in FIG. 12A, in the optical axis direction, the N pole portion of the seventh magnetic member MG7 and the S pole portion of the ninth magnetic member MG9 face each other with a synthetic resin in between.

Also, the eighth magnetic member MG8 and the tenth magnetic member MG10 are arranged such that, when the first swing member 2 swings in the other direction about the first axial line (the first swing axis AX1), the magnetic attraction force that acts between the eighth magnetic member MG8 and the tenth magnetic member MG10 increases. For example, the eighth magnetic member MG8 and the tenth magnetic member MG10 are arranged such that, as illustrated in FIG. 12A, in the optical axis direction, the N pole portion of the eighth magnetic member MG8 and the S pole portion of the tenth magnetic member MG10 face each other with a synthetic resin in between.

In the above-described embodiment, the seventh magnetic member MG7 to the tenth magnetic member MG10 are all permanent magnets with two magnetized poles in the Z-axial direction.

Furthermore, the seventh magnetic member MG7 and the ninth magnetic member MG9 are arranged such that, as illustrated in FIG. 12A, when the first swing member 2 swings clockwise about the first swing axis AX1 in right side view, the N pole portion of the seventh magnetic member MG7 and the S pole portion of the ninth magnetic member MG9 approach each other, and the magnetic attraction force that acts between the seventh magnetic member MG7 and the ninth magnetic member MG9 increases.

Also, the eighth magnetic member MG8 and tenth magnetic member MG10 are arranged such that, as illustrated in FIG. 12A, when the first swing member 2 swings counterclockwise about the first swing axis AX1 in right side view, the N pole portion of the eighth magnetic member MG8 and the S pole portion of the tenth magnetic member MG10 approach each other, the magnetic attraction force that acts between the eighth magnetic member MG8 and the tenth magnetic member MG10 increases.

This configuration brings about the effect of assisting the swing of the first swing by the magnetic force that acts between the magnetic members MG. Also, this configuration brings about the effect of allowing the first swing member 2 to swing reliably about the first axial line (the first swing axis AX1) by using the magnetic attraction force that acts between the magnetic members MG.

The eighth magnetic member MG8 may be constituted by a magnet. In this case, a second magnetic sensor (the rear magnetic sensor 11B) for detecting the magnetic field generated from the eighth magnetic member MG8 may be provided in the fixed member FB so as to be located on the outer side of the eighth magnetic member MG8 at a distance in the direction of the second axial line (the second swing axis AX2).

In the above-described embodiment, the eighth magnetic member MG8 is constituted by a permanent magnet with two magnetized poles in the Z-axial direction. Furthermore, as illustrated in FIG. 12A, the rear magnetic sensor 11B provided as a second magnetic sensor for detecting the magnetic field generated from the eighth magnetic member MG8 is provided in the fixed member FB (the tongue part 10T of the insulating circuit board 10 illustrated in FIG. 2) so as to be located on the outer side (the X2 side) of the eighth magnetic member MG8 at a distance along the direction of the second axial line (the second swing axis AX2).

With this configuration, the second magnetic sensor can detect the amount of swing of the first swing member 2 about the first swing axis AX1 by using the magnetic field generated from the eighth magnetic member MG8 (the rear magnetic sensor 11B).

Now, a preferred embodiment of the present invention has been described in detail above. However, the present invention is by no means limited to the embodiment described above, and a variety of changes and substitutions can be introduced to the above-described embodiment without departing from the scope of the present invention. Also, the features described with regards to the above embodiment may be combined as appropriate as long as there is no technical conflict.

For example, in the embodiment described above, the first front wire pair consisting of the first inner wire 9A1 and the second inner wire 9A2 is arranged on the front side (the X1 side) of the first swing member 2, the first rear wire pair consisting of the third inner wire 9A3 and the fourth inner wire 9A4 is arranged on the rear side (the X2 side) of the first swing member 2, the second left wire pair consisting of the first outer wire 9B1 and the second outer wire 9B2 is arranged on the left side (the Y1 side) of the first swing member 2, and the second right wire pair consisting of the third outer wire 9B3 and the fourth outer wire 9B4 is arranged on the right side (the Y2 side) of the first swing member 2. However, the number of shape memory alloy wires 9 to be arranged on at least one of the front side, the rear side, the left side, and the right side of the first swing member 2 may be one. In this case, one shape memory alloy wire 9 may be fixed or supported at three points, namely both end parts and the center part, so as to bend in a V shape or an inverted V shape. For example, one shape memory alloy wire 9 that is arranged on the front side of the first swing member 2 may have both of its end parts fixed to the first front metal member 5AF in a state in which its center part is hooked on a protrusion formed in the front wall part 7WF of the second swing member 7. In this case, the first front metal member 5AF is separated into two.

Also, although, in the above-described embodiment, the positions of the movable members MB are detected based on output of the magnetic sensor 11, the positions of the movable members MB may be detected based on output of other sensors such as a sensor that detects the resistance value of the shape memory alloy wires 9.

Also, although, in the above-described embodiment, the metal members 5 are fixed to an object (the first swing member 2 (the lower holder 2D), the second swing member 7, or the base member 8) with an adhesive or by welding, the metal members 5 may be embedded in the object to which they are fixed, or the metal members 5 may be a conductive pattern that is formed on the surface of the object to which they are fixed. Also, in the above embodiment, the first swing member 2 and the second swing member 7 are configured such that the first axis part provided in one of the first swing member 2 and the second swing member 7 and the first receiving part provided in the other one to receive the first axis part enable the first swing member 2 to swing about the first axial line (the first swing axis AX1) relative to the second swing member 7. However, the first swing member 2 and the second swing member 7 may also be configured such that a spherical body is arranged between the first swing member 2 and the second swing member 7 and enables the first swing member 2 to swing about the first axial line (the first swing axis AX1) relative to the second swing member 7. Also, in the above embodiment, the second swing member 7 and the fixed member FB are configured such that the second axis part provided in one of the second swing member 7 and the fixed member FB and the second receiving part provided in the other one to receive the second axis part enable second swing member 7 to swing about the second axial line (the second swing axis AX2) relative to the fixed member FB. However, the second swing member 7 and the fixed member FB may also be configured such that a spherical body is arranged between the second swing member 7 and the fixed member FB and enables the second swing member 7 to swing about the second axial line (the second swing axis AX2) relative to the fixed member FB.

What is claimed is:

1. An optical module drive device comprising:
   a first swing member configured to hold an optical module including a lens body and an image sensor;
   a second swing member connected to the first swing member such that the first swing member is swingable about a first axial line that intersects an optical axis direction;
   a fixed member connected to the second swing member such that the second swing member is swingable about a second axial line that intersects the optical axis direction and is perpendicular to an axial direction of the first axial line;
   a drive part configured to make the first swing member swing relative to the fixed member such that an optical axis of the lens body tilts, and
   a leaf spring member being integrally formed as a single component and configured to connect the first swing member, the second swing member and the fixed member together at a same time,
   wherein the drive part includes a plurality of shape memory alloy wires provided between movable members including the first swing member and the second swing member, and the fixed member.

2. The optical module drive device according to claim 1, wherein the drive part includes a plurality of first shape memory alloy wires provided between the first swing member and the second swing member, and
   wherein the plurality of shape memory alloy wires provided between the movable member and the fixed member are constituted by a plurality of second shape memory alloy wires provided between the second swing member and the fixed member.

3. The optical module drive device according to claim 2, wherein the first shape memory alloy wires are arranged at two locations that are spaced apart in an axial direction of the second axial line with the first swing member in between, and
   wherein the second shape memory alloy wires are arranged at two locations that are spaced apart in the axial direction of the first axial line with the first swing member in between.

4. The optical module drive device according to claim 3, wherein two of the first shape memory alloy wires are arranged at each of the two locations spaced apart in the axial direction of the second axial line,
   wherein the two first shape memory alloy wires at each of the two locations intersect each other when viewed in the axial direction of the second axial line, and form a first wire pair,
   wherein two of the second shape memory alloy wires are arranged at each of the two locations spaced apart in the axial direction of the first axial line, and
   wherein the two second shape memory alloy wires at each of the two locations intersect each other when viewed in the axial direction of the first axial line, and form a second wire pair.

5. The optical module drive device according to claim 4, wherein the two first shape memory alloy wires forming the first wire pair each have one end part electrically connected mutually between the two first shape memory alloy wires, and/or
   wherein the two second shape memory alloy wires forming the second wire pair each have one end part electrically connected mutually between the two second shape memory alloy wires.

6. The optical module drive device according to claim 1, wherein the first swing member and the second swing member are configured such that a first axis part provided in one of the first swing member and the second swing member and a first receiving part provided in the other one of the first swing member and the second swing member to receive the first axis part enable the first swing member to swing about the first axial line relative to the second swing member, and wherein the second swing member and the fixed member are configured such that a second axis part provided in one of the second swing member and the fixed member and a second receiving part provided in the other one of the second swing member and the fixed member to receive the second axis part enable the second swing member to swing about the second axial line relative to the fixed member.

7. An optical module drive device, comprising:

a first swing member configured to hold an optical module including a lens system and an imaging system;

a second swing member connected to the first swing member such that the first swing member is swingable about a first axial line that intersects an optical axis direction;

a fixed member connected to the second swing member such that the second swing member is swingable about a second axial line that intersects the optical axis direction and is perpendicular to an axial direction of the first axial line; and a drive part configured to make the first swing member swing relative to the fixed member such that an optical axis of the lens system tilts, wherein the drive part includes a plurality of shape memory alloy wires provided between movable members including the first swing member and the second swing member, and the fixed member, wherein the drive part includes a plurality of first shape memory alloy wires provided between the first swing member and the second swing member, wherein the plurality of shape memory alloy wires provided between the movable member and the fixed member are constituted by a plurality of second shape memory alloy wires provided between the second swing member and the fixed member, wherein the first shape memory alloy wires are arranged at two locations that are spaced apart in an axial direction of the second axial line with the first swing member in between, wherein the second shape memory alloy wires are arranged at two locations that are spaced apart in the axial direction of the first axial line with the first swing member in between, wherein two of the first shape memory alloy wires are arranged at each of the two locations spaced apart in the axial direction of the second axial line, wherein the two first shape memory alloy wires at each of the two locations intersect each other when viewed in the axial direction of the second axial line, and form a first wire pair, wherein two of the second shape memory alloy wires are arranged at each of the two locations spaced apart in the axial direction of the first axial line, wherein the two second shape memory alloy wires at each of the two locations intersect each other when viewed in the axial direction of the first axial line, and form a second wire pair, wherein the two first shape memory alloy wires forming the first wire pair each have one end part electrically connected mutually between the two first shape memory alloy wires, and/or wherein the two second shape memory alloy wires forming the second wire pair each have one end part electrically connected mutually between the two second shape memory alloy wires, wherein the first swing member includes a first metal member that is configured to electrically connect, mutually, the one end part of each of the two first shape memory alloy wires forming the first wire pair between the two first shape memory alloy wires, and wherein the one end part of each of the two first shape memory alloy wires is fixed to the first metal member.

8. The optical module drive device according to claim 7, wherein the second swing member includes a second metal member to which the other end part of one of the two first shape memory alloy wires is fixed, and a third metal member to which the other end part of the other one of the two first shape memory alloy wires is fixed, and wherein the first metal member, the second metal member, and the third metal member have respective flat parts that are arranged substantially in parallel.

9. The optical module drive device according to claim 8, wherein a first conductive member and a second conductive member made of metal are embedded in the second swing member, wherein a first leaf spring member and a second leaf spring member made of metal are provided between the second swing member and the fixed member, wherein the first conductive member has a first connecting part and a second connecting part that are exposed from the second swing member, wherein the second conductive member has a third connecting part and a fourth connecting part that are exposed from the second swing member, wherein the first connecting part is connected to the second metal member, wherein the second connecting part is connected to the first leaf spring member, wherein the third connecting part is connected to the third metal member, and wherein the fourth connecting part is connected to the second leaf spring member.

10. The optical module drive device according to claim 7, wherein the second swing member has a fourth metal member that is configured to electrically connect the one end part of each of the two second shape memory alloy wires forming the second wire pair mutually between the two second shape memory alloy wires, and wherein the one end part of each of the two second shape memory alloy wires is fixed to the fourth metal member.

11. An optical module drive device comprising:

a first swing member configured to hold an optical module including a lens system and an imaging system;

a second swing member connected to the first swing member such that the first swing member is swingable about a first axial line that intersects an optical axis direction;

a fixed member connected to the second swing member such that the second swing member is swingable about a second axial line that intersects the optical axis direction and is perpendicular to an axial direction of the first axial line; and a drive part configured to make the first swing member swing relative to the fixed member such that an optical axis of the lens system tilts, wherein the drive part includes a plurality of shape memory alloy wires provided between movable members including the first swing member and the second swing member, and the fixed member, wherein the first swing member and the second swing member are configured such that a first axis part provided in one of the first swing member and the second swing member and a first receiving part provided in the other one of the first swing member and the second swing member to receive the first axis part enable the first swing member to swing about the first axial line relative to the second swing member, wherein the second swing member and the fixed member are configured such that a second axis part provided in one of the second swing member and the fixed member and a second receiving part provided in the other one of the second swing member and the fixed member to receive the second axis part enable the second swing member to swing about the second axial line relative to the fixed member, wherein the first receiving part has at least a recessed portion that is open in the optical axis direction, wherein a first preloading member configured to exert a force that causes the first axis part and the first receiving part to press against each other is provided between the first swing member and the second swing member, wherein the second receiving part has at least a recessed portion that is open in the optical axis direction, and wherein a second preloading member configured to exert a force that causes the second axis part and the second receiving part to press against each other is provided between the second swing member and the fixed member.

12. The optical module drive device according to claim 11,
wherein a first direction in which the first swing member is preloaded by the first preloading member towards the second swing member and a second direction in which the second swing member is preloaded by the second preloading member towards the fixed member are opposite to each other.

13. The optical module drive device according to claim 12,
wherein the first swing member has
a first frame-like part, and
the first axis part constituted by two protruding portions that protrude outward from each of two opposing side wall parts of the first frame-like part,
wherein the second swing member has
a second frame-like part located on an outer side of the first frame-like part, and
the first receiving part constituted by the two recessed portions formed in a lower end part of each of two opposing side wall parts of the second frame-like part, and
wherein the first receiving part is arranged above the first axis part.

14. The optical module drive device according to claim 11,
wherein the first preloading member and the second preloading member are constituted by a same leaf spring member.

15. The optical module drive device according to claim 14,
wherein the leaf spring members have
a first fixed part that is fixed to the first swing member,
a second fixed part that is fixed to the second swing member,
a third fixed part that is fixed to the fixed member,
a first elastic arm part that is provided between the first fixed part and the second fixed part, and
a second elastic arm part that is provided between the second fixed part and the third fixed part,
wherein the first fixed part is fixed to the first swing member in a vicinity of the first axial line, and
wherein the second fixed part is fixed to the second swing member in a vicinity of the second axis.

* * * * *